(12) United States Patent
Salkintzis et al.

(10) Patent No.: US 12,089,177 B2
(45) Date of Patent: Sep. 10, 2024

(54) REGISTERING WITH A MOBILE NETWORK THROUGH ANOTHER MOBILE NETWORK

(71) Applicants: Lenovo (Singapore) PTE. LTD., New Tech Park (SG); Apostolis Salkintzis, Athens (GR); Genadi Velev, Darmdstadt (DE); Dimitrios Karampatsis, Ruislip (GB); Roozbeh Atarius, La Jolla, CA (US)

(72) Inventors: Apostolis Salkintzis, Athens (GR); Genadi Velev, Darmdstadt (DE); Dimitrios Karampatsis, Ruislip (GB); Roozbeh Atarius, La Jolla, CA (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 344 days.

(21) Appl. No.: 17/764,514

(22) PCT Filed: Nov. 8, 2019

(86) PCT No.: PCT/EP2019/080744
§ 371 (c)(1),
(2) Date: Mar. 28, 2022

(87) PCT Pub. No.: WO2021/089177
PCT Pub. Date: May 14, 2021

(65) Prior Publication Data
US 2022/0346051 A1 Oct. 27, 2022

(51) Int. Cl.
*H04W 60/00* (2009.01)
*H04W 12/06* (2021.01)
*H04W 76/10* (2018.01)

(52) U.S. Cl.
CPC ........... *H04W 60/00* (2013.01); *H04W 12/06* (2013.01); *H04W 76/10* (2018.02)

(58) Field of Classification Search
CPC ...... H04W 60/00; H04W 76/10; H04W 12/06
See application file for complete search history.

(56) References Cited

U.S. PATENT DOCUMENTS 10,873,891 B2 * 12/2020 Hill ..................... H04W 36/322
11,356,840 B2 * 6/2022 Velev .................. H04W 88/085
(Continued)

FOREIGN PATENT DOCUMENTS

| BR | 112019016206 A2 * | 4/2020 | ......... H04L 12/2818 |
| CN | 111447675 B * | 11/2021 | ............ H04W 12/02 |

(Continued)

OTHER PUBLICATIONS

PCT/EP2019/080744, "Notification Concerning Transmittal of International Preliminary Report on Patentability", Patent Cooperation Treaty, May 19, 2022, pp. 1-12.

(Continued)

*Primary Examiner* — Adam D Houston
(74) *Attorney, Agent, or Firm* — Kunzler Bean & Adamson

(57) ABSTRACT

Apparatuses, methods, and systems are disclosed for registering with a mobile communication network ("MCN") through another MCN. One apparatus includes a processor and a transceiver, wherein the apparatus is registered with a first MCN. The processor determines to register with a second MCN via the first MCN and sends a request to establish a data connection with the first MCN. The processor receives a command from the first MCN that initiates an authentication procedure with the first MCN and a registration procedure for registering the apparatus with the MCN. The processor exchanges a plurality of authentication messages with the first MCN, each of the authentication messages containing a signaling message for registering the apparatus with the second MCN, and completes the regis- (Continued)

tration with the second MCN via the data connection in response to successfully establishing the data connection.

19 Claims, 13 Drawing Sheets

(56) References Cited

U.S. PATENT DOCUMENTS

| | | | | |
|---|---|---|---|---|
| 11,671,893 | B2 * | 6/2023 | Hill | H04W 36/32 |
| | | | | 370/331 |
| 2013/0265985 | A1 * | 10/2013 | Salkintzis | H04W 12/062 |
| | | | | 370/331 |
| 2016/0255674 | A1 * | 9/2016 | Niemi | H04W 60/04 |
| | | | | 455/435.1 |

FOREIGN PATENT DOCUMENTS

| | | | | | |
|---|---|---|---|---|---|
| CN | 116057982 | A | * | 5/2023 | H04L 63/0272 |
| CN | 117714370 | A | * | 3/2024 | H04L 45/42 |
| KR | 20230008697 | A | * | 1/2023 | |
| KR | 20230043226 | A | * | 3/2023 | |
| WO | WO-2016201796 | A1 | * | 12/2016 | H04W 8/10 |
| WO | WO-2018206081 | A1 | * | 11/2018 | H04W 12/06 |
| WO | WO-2020065628 | A1 | * | 4/2020 | |
| WO | WO-2020208295 | A1 | * | 10/2020 | |
| WO | WO-2022207089 | A1 | * | 10/2022 | H04L 47/24 |

OTHER PUBLICATIONS

Huawei, Hisilicon, "Living CR for 5WWC", 3GPP TSG SA WG3 (Security) Meeting #96-Adhoc S3-193684, Oct. 14-18, 2019, pp. 1-19.

3GPP, "3rd Generation Partnership Project; Technical Specification Group Services and System Aspects; Procedures for the 5G System (5GS); Stage 2 (Release 16)", 3GPP TS 23.502 V16.2.0, Sep. 2019, pp. 1-525.

3GPP, "3rd Generation Partnership Project; Technical Specification Group Services and System Aspects; Study on the security of the wireless and wireline convergence for the 5G system architecture (Release 16)", 3GPP TR 33.807 V16.0.1, Oct. 2019, pp. 1-33.

3GPP, "3rd Generation Partnership Project; Technical Specification Group Services and System Aspects; Study on the Wireless and Wireline Convergence for the 5G system architecture (Release 16)", 3GPP TR 23.716 V1.0.0, Sep. 2018, pp. 1-134.

3GPP, "3rd Generation Partnership Project; Technical Specification Group Services and System Aspects; Study on the Wireless and Wireline Convergence for the 5G system architecture (Release 16)", 3GPP TR 23.716 V16.0.0, Dec. 2018, pp. 1-184.

3GPP, "3rd Generation Partnership Project; Technical Specification Group Services and System Aspects; System Architecture for the 5G System (5GS); Stage 2 (Release 16)", 3GPP TS 23.501 V16.2.0, Sep. 2019, pp. 1-391.

3GPP, "3rd Generation Partnership Project; Technical Specification Group Services and System Aspects; Wireless and wireline convergence access support for the 5G System (5GS) (Release 16)", 3GPP TS 23.316 V16.1.0, Sep. 2019.

* cited by examiner

REGISTERING WITH A MOBILE NETWORK THROUGH ANOTHER MOBILE NETWORK

The subject matter disclosed herein relates generally to wireless communications and more particularly relates to registering with a mobile network through another mobile network.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Point Name ("APN"), Access Stratum ("AS"), Application Programing Interface ("API"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Transmission Control Protocol ("TCP"), Transmit ("Tx"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), Wireless Local Area Network ("WLAN"), and Worldwide Interoperability for Microwave Access ("WiMAX").

In certain embodiments, a UE may connect to a 5G core ("5GC") network of a public land mobile network ("PLMN") via an untrusted network using a non-3GPP interworking function ("N3IWF") in the PLMN. However, not all PLMNs support access via untrusted networks.

BRIEF SUMMARY

Methods for registering with a mobile network through another mobile network are disclosed. Apparatuses and systems also perform the functions of the methods.

One method for registering with a mobile network through another mobile network includes registering the UE with a first mobile communication network and determining to register the UE with a second mobile communication network via a first mobile communication network. The method includes sending a request to establish a data connection with the first mobile communication network, the request including an identifier of a second mobile communication network, and receiving a command from the first mobile communication network, the command initiating an authentication procedure with the first mobile communication network and a registration procedure for registering with the second mobile communication network. The method includes exchanging a plurality of authentication messages with the first mobile communication network, wherein each of the plurality of authentication messages contains a signaling message for registering the UE with the second mobile communication network, and completing the registration with the second mobile communication network via the data connection in response to successfully establishing the data connection.

Another method for registering with a mobile network through another mobile network includes registering a gateway device with a first mobile communication network and receiving a network access identifier ("NAI") from a UE attempting to connect to the gateway device wherein the NAI includes an identity of a second mobile communication network. The method includes sending a request to establish a data connection with the first mobile communication network, the request including an identity of the second mobile communication network and receiving a command from the first mobile communication network, the command initiating an authentication procedure with the first mobile communication network and a registration procedure for registering the UE with the second mobile communication network. The method includes exchanging a plurality of authentication messages with the first mobile communication network, wherein each of the plurality of authentication messages contains a signaling message for registering the UE with the second mobile communication network, and receiving an accept message indicating that the data connection with the first mobile communication network is successfully established in response to successful authentication of the UE with the second mobile communication network, wherein the UE completes the registration with the second mobile communication network via the data connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
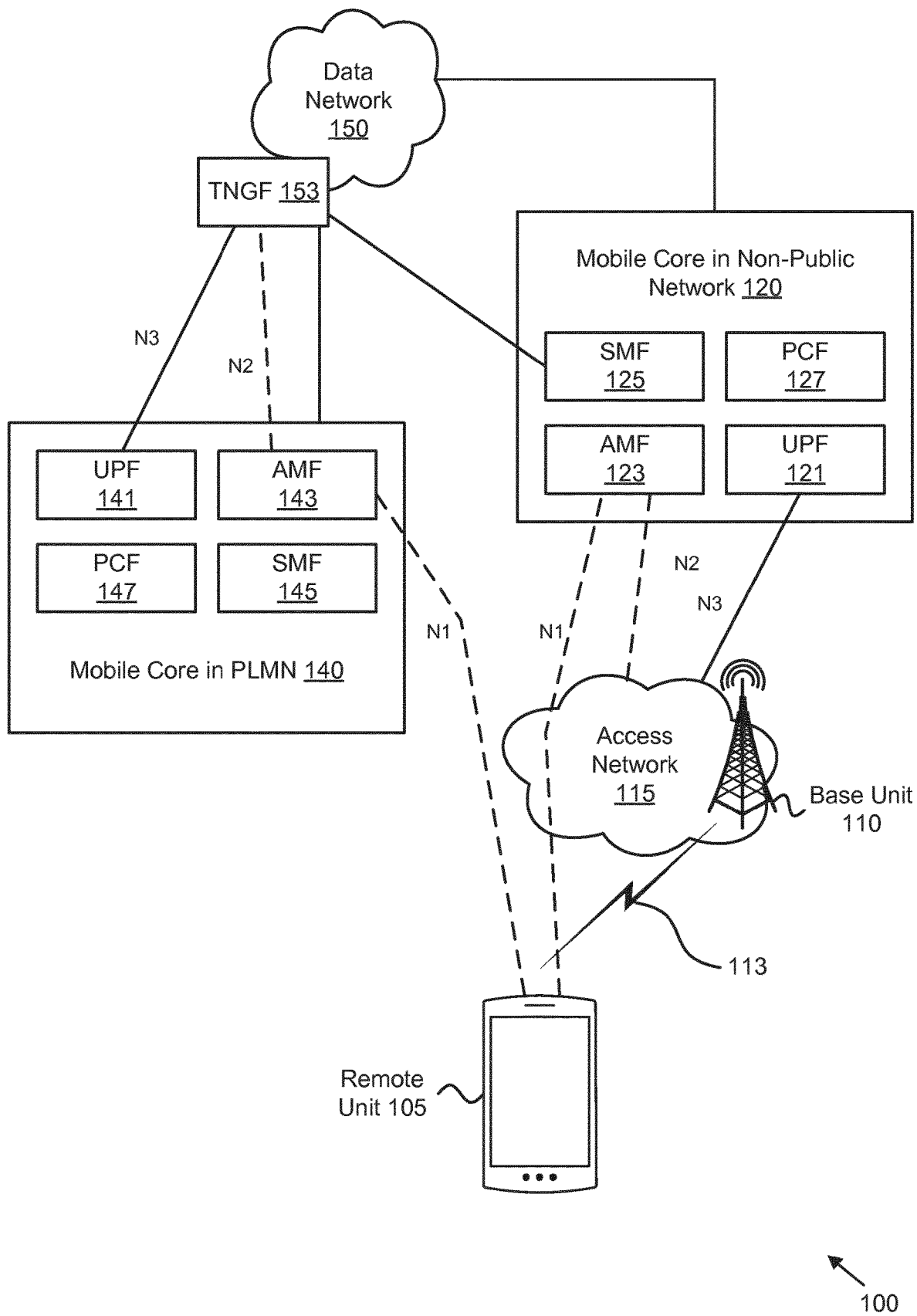
FIG. 1 is a diagram illustrating one embodiment of a wireless communication system for registering with a mobile network through another mobile network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for registering with a mobile network through another mobile network. A UE may connect to a 5G core network in a PLMN via a 5G core in a Standalone Non-Public Network ("SNPN") and vice versa. In some embodiments, the UE is simultaneously connected to two 5G core networks: a first 5G core in the SNPN and a second 5G core in the PLMN. The UE connects to the 5G core in the PLMN after obtaining IP connectivity via the SNPN (i.e., after establishing a PDU Session with the SNPN with type 'IP'), by initiating the N3IWF discovery procedure and then the 5G registration procedure via the selected N3IWF. One example of 5G registration procedure via the selected N3IWF is described in clause 4.12 of 3GPP TS 23.502, v16.2.0. As a result, the UE establishes a signaling IPsec SA with the selected N3IWF and may also establish one or more user-data IPsec SAs with the selected N3IWF, after setting up a PDU Session with the PLMN.

However, using an N3IWF to connect to a PLMN via an SNPN features several drawbacks. For example, a PLMN may support only trusted non-3GPP access, so it does not support an N3IWF. In this case, the UE cannot access the PLMN via the SNPN. As another example, the communication between the UE and the N3IWF in the PLMN is typically transparent to the SNPN (e.g., unless a dedicated DNN and/or S-NSSAI is employed in the SNPN for supporting connectivity to PLMNs). Therefore, the IP connectivity service provided by the SNPN cannot be configured to optimize the communication between the UE and the PLMN. As an illustration, the SNPN 3GPP access might be configured to apply confidentiality protection, which is unnecessary since the UE-to-N3IWF communication is protected by IPsec. Or, the QoS enforced by the SNPN over the PDU Session is not adequate to support real-time services between the UE and the PLMN.

Another example of a drawback of N3IWF use is that even if the UE supports only 3GPP access, the UE must be able to support procedures used for untrusted non-3GPP access (i.e. the N3IWF discovery procedure) and/or must be configured with N3IWF selection information. As another example, if the UE supports connectivity with N3IWF and with ePDG, then it may not be able to connect to an N3IWF of a PLMN because its "non-3GPP access node selection information" indicates that the ePDG is preferable for this PLMN. Example of combined N3IWF/ePDG Selection procedures are described in 3GPP TS 23.501, v16.2.0.

Moreover, the UE may not be able to connect to the desired PLMN via the SNPN. For example, if the UE is roaming (it is located in a country other than the country of its HPLMN), the UE may be instructed to connect to an N3IWF in a VPLMN which has no roaming agreements with the UE's HPLMN.

To overcome the above drawbacks, this disclosure describes alternative procedures for the UE to connect to the 5G core in the PLMN after obtaining IP connectivity via the SNPN. As described in greater detail below, the UE may connect with a TNGF (Trusted Non-3GPP Gateway Function) in the PLMN, instead of an N3IWF. Accordingly, new and different procedures are required for the UE to connect to the PLMN using the TNGF.

FIG. 1 depicts a wireless communication system 100 for registering with a mobile network through another mobile network, according to embodiments of the disclosure. In one embodiment, the wireless communication system 100 includes at least one remote unit 105, at least one base unit 110, at least one access network ("AN") 115, a mobile core network 120 in a non-public network, and a mobile core network 140 in a PLMN. The AN 115 may be composed of at least one base unit 110. The remote unit 105 may communicate with the access network 115 using 3GPP communication links and/or non-3GPP communication links, according to a radio access technology deployed by the AN 115. Even though a specific number of remote units 105, base units 110, ANs 115, mobile core networks 120, and mobile core networks 140 are depicted in FIG. 1, one of skill in the art will recognize that any number of remote units 105, base units 110, ANs 115, mobile core networks 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the access network 115 via uplink ("UL") and downlink ("DL") communication signals. Furthermore, the UL and DL communication signals may be carried over the communication links 113. Note, that the access network 115 is an intermediate network that provide the remote units 105 with access to the mobile core network 120 and/or mobile core network 140.

In some embodiments, the remote units 105 communicate with an application server (or other communication peer) via a network connection with the mobile core networks 120 and/or 140. For example, an application in a remote unit 105 (e.g., web browser, media client, telephone/VoIP application) may trigger the remote unit 105 to establish a PDU session (or other data connection) with the mobile core network 120 using the access network 115. The mobile core network 120 then relays traffic between the remote unit 105 and the data network 150 (e.g., application server) using the PDU session. Note that the remote unit 105 may establish one or more PDU sessions (or other data connections) with the mobile core network 120. As such, the remote unit 105 may have at least one PDU session for communicating with the data network 150. The remote unit 105 may establish additional PDU sessions for communicating with other data network and/or other communication peers.

As discussed in further detail below, a mobile data connection (PDU session) of a remote unit 105 with the mobile core network 120 may be used to register the remote unit 105 with the mobile core network 140. Specifically, the remote unit 105 may register with the mobile core network 140 using the TNGF 153 in order to benefit from enhanced IP connectivity, as described in further detail below.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 115, that may include one or more controllers communicably coupled to one or more corresponding base units 110. These and other elements of radio access network are not illustrated but are well known generally by those having ordinary skill in the art. The base units 110 connect to the mobile core network 140 via the access network 115.

The base units 110 may serve a number of remote units 105 within a serving area, for example, a cell or a cell sector, via a communication link 113. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 110.

In one embodiment, the mobile core networks 120 and 140 are 5G core ("5GC") or the evolved packet core ("EPC"), which may be coupled to a data network (e.g., the data network 150, such as the Internet and private data networks, among other data networks). A remote unit 105 may have a subscription or other account with the non-public mobile core network 120. Additionally, the remote unit 105 may have a subscription or other account with the public mobile core network 140. The present disclosure is not intended to be limited to the implementation of any particular wireless communication system architecture or protocol.

The mobile core network 120 includes several network functions ("NFs"). As depicted, the mobile core network 120 includes multiple user plane functions ("UPFs"). Here, the mobile core network 120 includes at least one UPF 121 that serves the access network 115. The mobile core network 120 also includes multiple control plane functions including, but not limited to, an Access and Mobility Management Function ("AMF") 123, a Session Management Function ("SMF") 125, and Policy Control Function ("PCF") 127. In certain embodiments, the mobile core network 120 may also include a Unified Data Management function ("UDM"), an Authentication Server Function ("AUSF"), a Network Repository Function ("NRF") (used by the various NFs to discover and communicate with each other over APIs), or other NFs defined for the 5GC. Although depicted as a mobile core in a non-public network, in other embodiments the mobile core 120 may be a mobile core is a separate PLMN than the mobile core network 140. In such embodiments, the remote unit 105 may establish a data connection with the mobile core network 120 to registers with the mobile core network 140 via the TNGF 153.

The mobile core network 140 also includes several network functions ("NFs"). As depicted, the mobile core network 140 includes multiple user plane functions ("UPFs"). Here, the mobile core network 140 includes at least one UPF 141 that serves the TNGF 153. The mobile core network 140 also includes multiple control plane functions including, but not limited to, an Access and Mobility Management Function ("AMF") 143, a Session Management Function ("SMF") 145, and Policy Control Function ("PCF") 147. In certain embodiments, the mobile core network 140 may also include a Unified Data Management function ("UDM"), an Authentication Server Function ("AUSF"), a Network Repository Function ("NRF") (used by the various NFs to discover and communicate with each other over APIs), or other NFs defined for the 5GC.

The TNGF 153 is a network function that supports access to a 5GC via non-3GPP access networks. In general, the TNGF 153 supports connectivity to one or more 5GC networks for UEs which do support the NAS protocol over non-3GPP access and the applicable NAS procedures. Here, the TNGF 153 is also being used to support access of the remote unit 105 to the mobile core network 140 via another mobile network, here the non-public mobile core network 120.

In various embodiments, the mobile core networks 120 and 140 support different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM. In another example, each network slice includes an AMF, an SMF and a UPF. Although specific numbers and types of network functions are depicted in FIG. 1, one of skill in the art will recognize that any number and type of network functions may be included in the mobile core networks 120 and 140.

To resolve the drawbacks of N3IWF access described above, this disclosure proposes solutions that enables a UE (e.g., the remote unit 105) to connect to a second 5G core network (in a PLMN) via a first 5G core network by using a TNGF of the second 5G core network, rather than using an N3IWF as prescribed by current 3GPP specifications. Described herein are two solutions: the Solution A where a UE (e.g., remote unit 105) registers with a PLMN through a non-public mobile network; and the Solution B where a UE (e.g., remote unit 105) operating behind a 5G-RG registers with a PLMN through another PLMN (e.g., through the PLMN with which the 5G-RG is registered). Note that the 5G-RG acts as an access network (e.g., RAN node) towards the UE operating behind the 5G-RG and acts as a UE towards the 5G CN.

Figure 2:
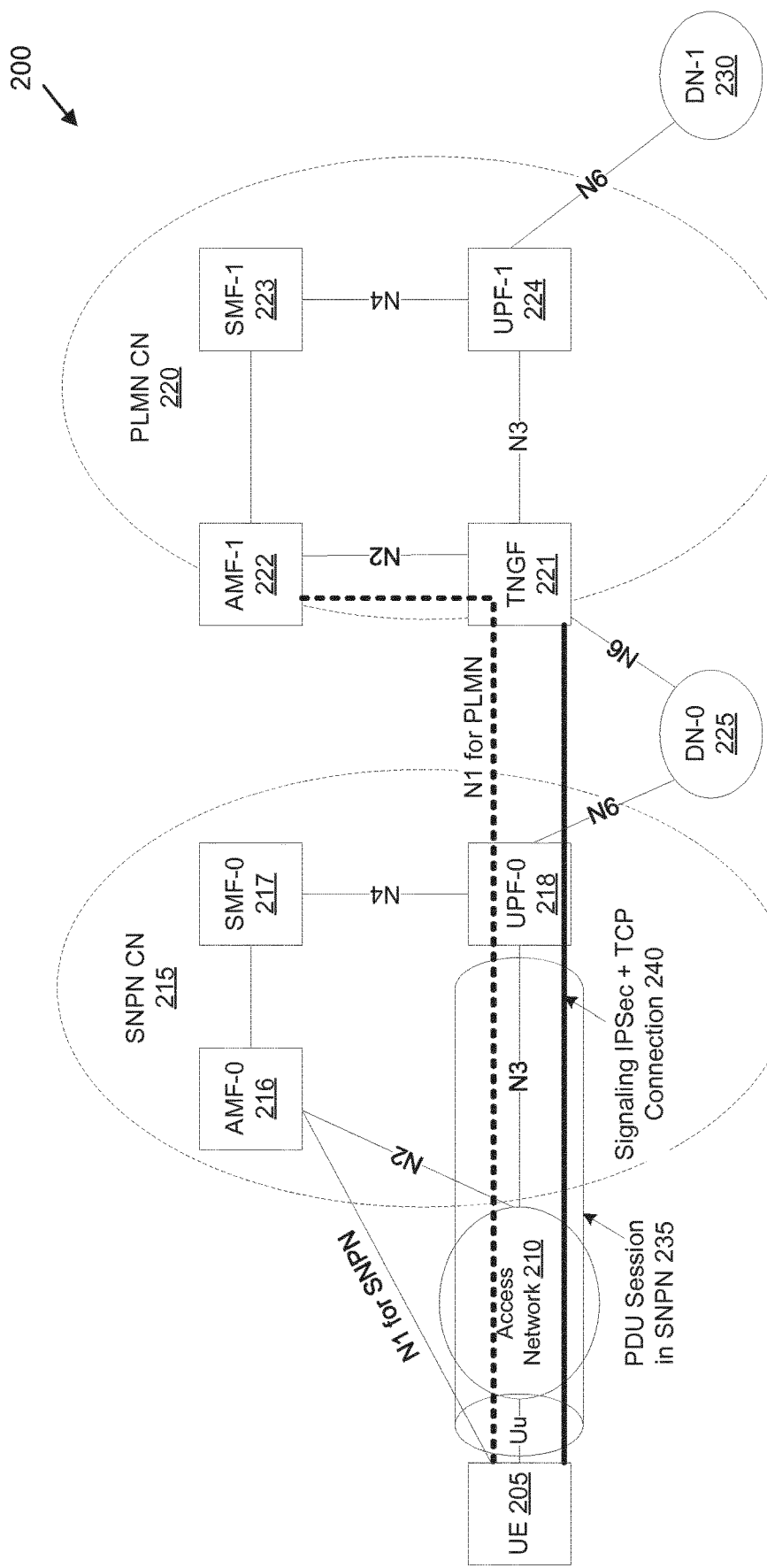
FIG. 2 is a diagram illustrating one embodiment of a network deployment for registering with a mobile network through another mobile network.

FIG. 2 depicts a network deployment 200 comprising a UE 205 which registers with a standalone non-public network ("SNPN") 215. The SNPN CN 215 includes at least an AMF ("AMF-0") 216, a SMF ("SMF-0") 217, and a UPF ("UPF-0") 218. In various embodiments, the SNPN CN 215 includes additional NFs as described above with reference to FIG. 1. Note that the UE 205 connects to the SNPN CN 215 via an Access Network 210. The UE 205 uses a data connection to the SNPN (e.g., a PDU Session 235 established with the SNPN) to register with a PLMN via a TNGF 221 in the PLMN CN 220. The PLMN CN 220 includes at least the TNGF 221, an AMF ("AMF-1") 222, a SMF ("SMF-1") 223, and a UPF ("UPF-1") 224. In various embodiments, the PLMN CN includes additional NFs as described above with reference to FIG. 1. As depicted, the SNPN CN and PLMN CN are connected via a data network ("DN-0") 225. Moreover, after registering with the PLMN, the UE 205 may access another data network ("DN-1") 230 via the UPF-1 224.

As depicted, the UE 205 establishes a data connection (depicted here as a PDU Session 235) with the SNPN. One example of the data connection establishment procedure is described below with reference to FIGS. 3A-3C. Note that the data connection establishment also initiates registration with the PLMN. After establishing the data connection, the UE 205 establishes a signaling IPSec SA and TCP connection 240 with the TNGF 221 and completes the registration with the PLMN. Accordingly, the UE 205 has an N1 connection with the AMF-0 216 for the SNPN and also an N1 connection with the AMF-1 222 for the PLMN.

Figure 3A:
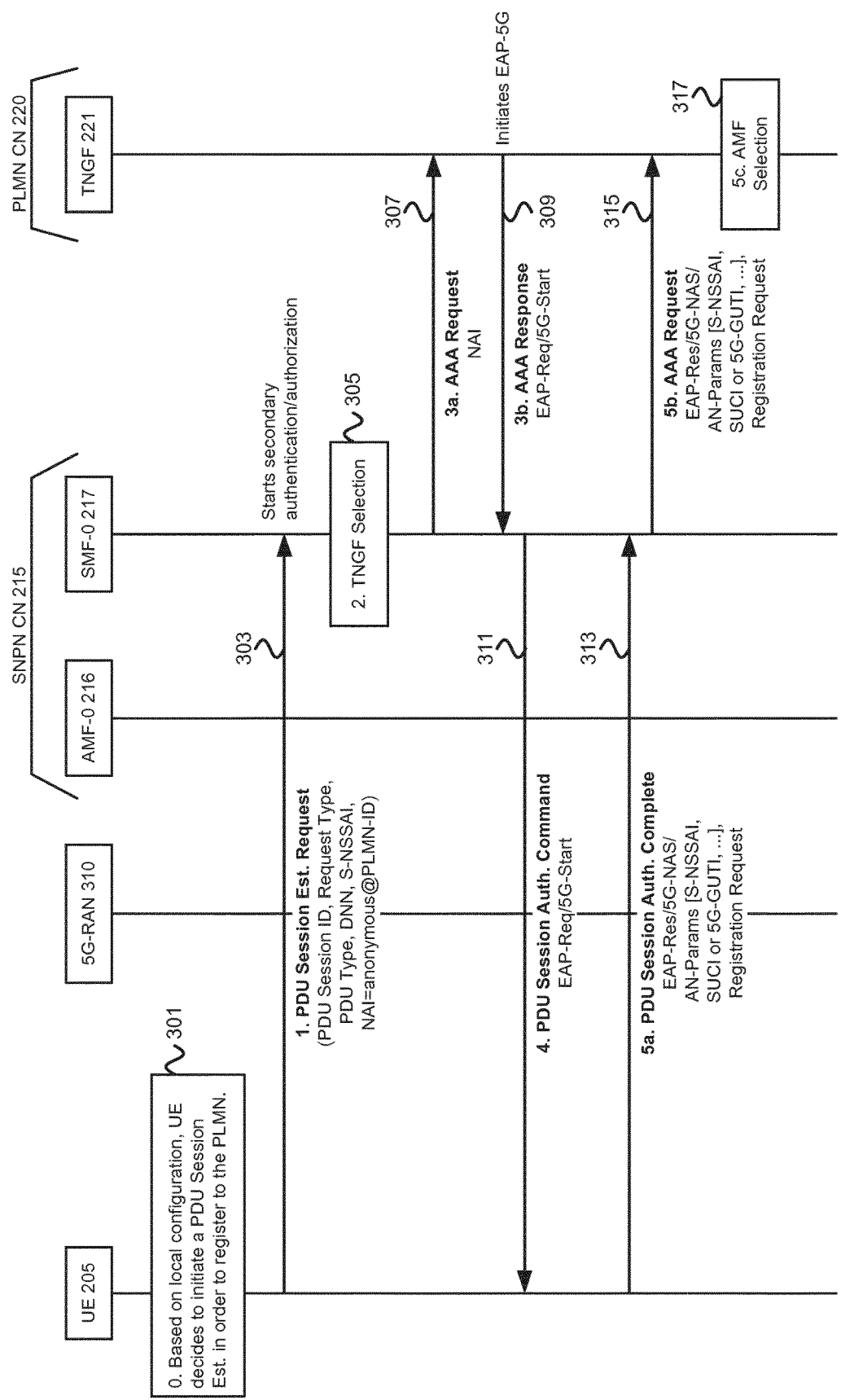
FIG. 3A is a signal flow diagram illustrating one embodiment of a procedure for registering with a PLMN through a non-public mobile network.
Figure 3B:
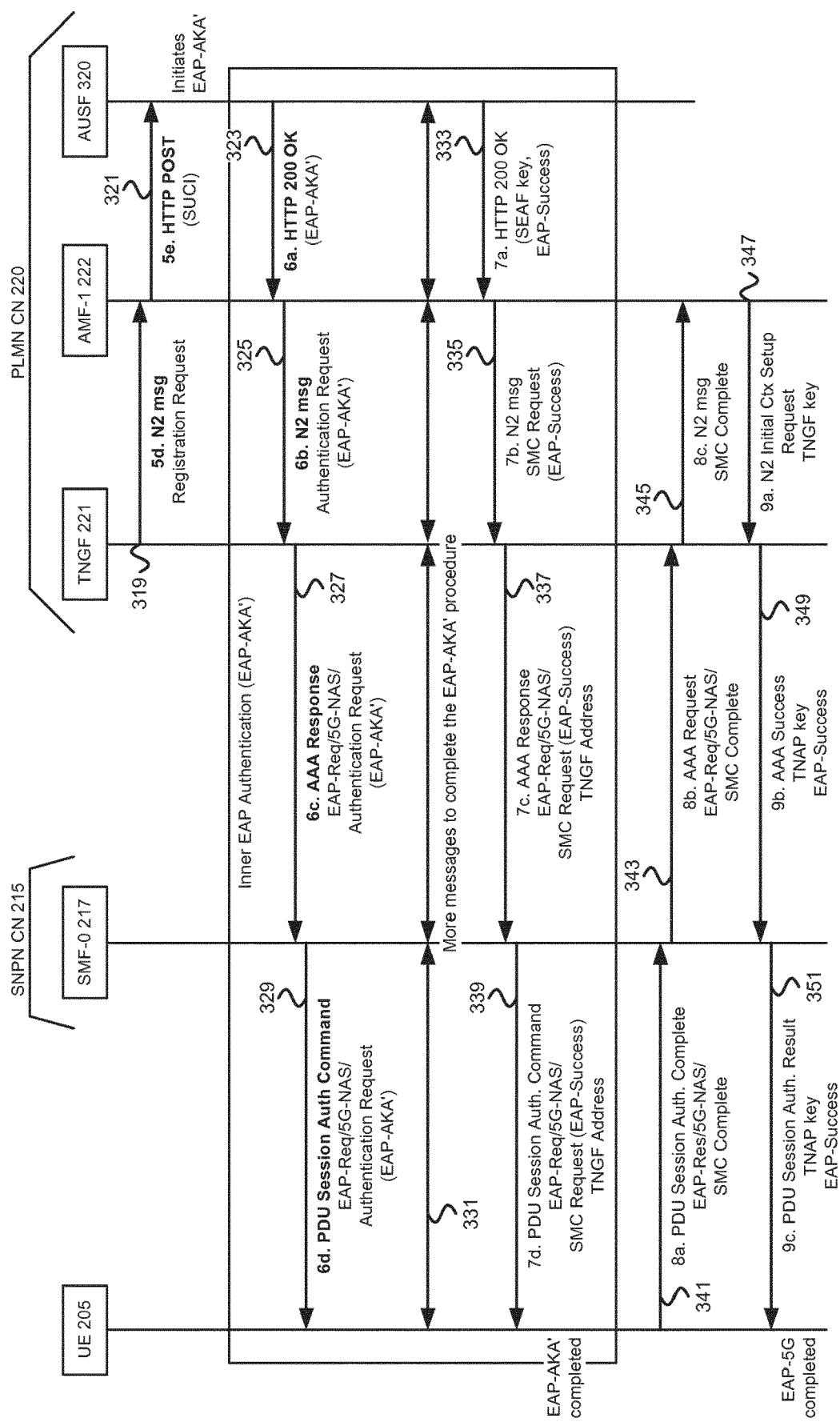
FIG. 3B is a continuation of the procedure depicted in FIG. 3A.
Figure 3C:
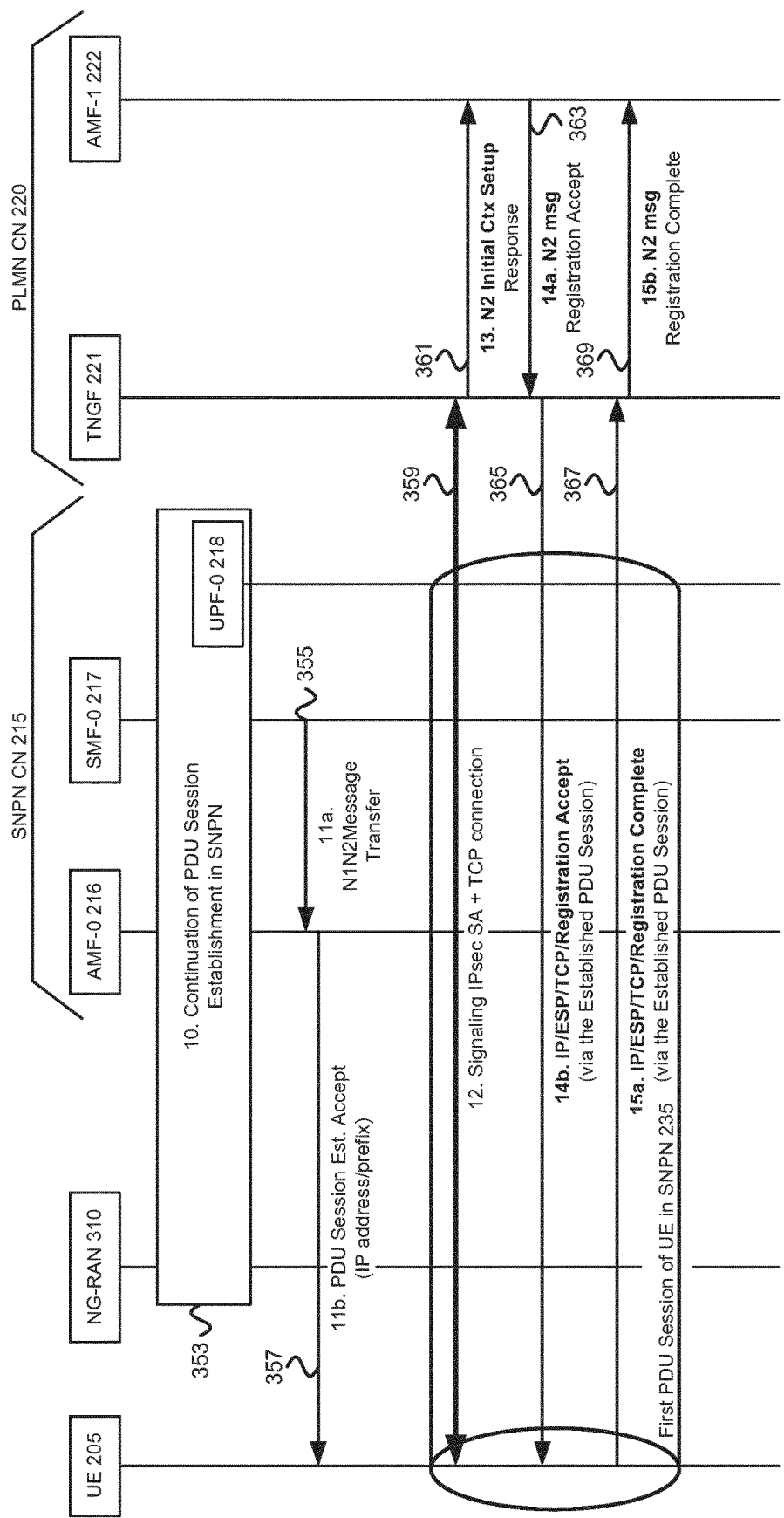
FIG. 3C is a continuation of the procedure depicted in FIGS. 3A-3B.

FIGS. 3A-3C depict a procedure 300 for registering with a mobile network through another mobile network, according to embodiments of the disclosure. The procedure 300 involves the UE (e.g., one embodiment of the remote unit 105), a 5G-RAN 310, an AMF, SMF, and UPF in a first PLMN ("PLMN-1", these NF are designated "AMF-0" 216, "SMF-0" 217, and "UPF-0" 218, respectively), and a TNGF, AMF, and AUSF in a second PLMN ("PLMN-2", these NF are designated "TNGF" 221, "AMF-1" 222, and "AUSF" 320, respectively). The procedure 300 details signaling flow for the Solution A where the UE 205 has registered with the 5G core 215 in the SNPN. It is assumed that the UE 205 has access credentials for both the SNPN and the PLMN. These credentials are separate and can be stored in an independent USIM profile, either in a physical UICC in the UE 205 or in an embedded UICC (eUICC).

Referring to FIG. 3A, the procedure 300 begins at Step 0 where, after being registered with the SNPN, the UE 205 decides to connect to a PLMN in order e.g. to access some PLMN services, such as IMS multimedia services, which are not available in the SNPN (see block 301). The UE 205 may take this decision based on some local configuration, or based on the URSP rules provisioned in the UE 205 by the SNPN.

At Step 1, the UE 205 selects a PLMN to connect to and determines to access this PLMN via the SNPN by using the trusted non-3GPP access procedure illustrated in FIGS. 3A-3C and described herein. Alternatively, the UE 205 may determine to access this PLMN via the SNPN by using the existing untrusted non-3GPP access procedure, i.e., to discover and connect to an N3IWF in the PLMN. Here, it is assumed that the UE 205 uses some local configuration data to determine which procedure to use.

During Step 1, the UE 205 initiates the establishment of a new PDU Session with the SNPN. This PDU Session will provide enhanced IP connectivity between the UE 205 and a TNGF 221 in the selected PLMN and will enforce the appropriate QoS, security and charging policies to the user-plane traffic.

The UE 205 sends a NAS message to AMF-0 216 containing a PDU Session Establishment Request message and indicating PDU Type=IP (e.g. IPv4, IPv6 or IPv4v6) (see messaging 303). The NAS message may also contain a certain DNN and S-NSSAI and shall contain a Network Access Identifier (NAI) including the identity of the selected PLMN in the realm part. For example, the NAI provided by the UE 205 could be formatted as NAI= anonymous@nai.5gc.mnc015.mcc234.3gppnetwork.org. This NAI indicates to SMF-0 217 that the UE 205 wants to register with 5GC in a PLMN with MCC=234 and MNC=015. The username part of NAI could include "anonymous" and any other non-null string.

Optionally, the UE 205 may also include an explicit indication in the PDU Session Establishment Request message indicating that this PDU Session is going to be used for accessing an external PLMN.

At Step 2, when SMF-0 217 receives the PDU Session Establishment Request via AMF-0 216, the SMF-0 217 initiates the secondary authentication/authorization procedure, because the SMF-0 217 receives a NAI from the UE 205. In one embodiment, the SMF-0 217 implements the secondary authentication/authorization procedure specified in 3GPP TS 23.501, clause 5.6.6. Accordingly, the SMF-0 217 selects a TNGF 221 based on the realm provided by the UE 205 (which contains a PLMN identity) and based on other parameters such local configuration (see block 305). From the SMF-0's point of view, the selected TNGF 221 is the same as a DN-AAA server operating in the DN, which the UE 205 attempts to connect to with the requested PDU Session.

At Step 3, the SMF-0 217 sends an AAA Request message to the selected TNGF 221, which operates as a DN-AAA server (see messaging 307). This message contains the NAI of the UE 205. The TNGF 221 initiates the normal procedure that is applied when a UE 205 requests to connect to 5GC via a trusted non-3GPP access and initiates an EAP authentication procedure with the UE 205 by applying the EAP-5G authentication method. Hence, the TNGF 221 sends an AAA Response to SMF-0 217 including an EAP-Request/5G-Start packet (see messaging 309).

At Step 4, the SMF-0 217 forwards the EAP-Request/5G-Start packet to the UE 205 inside a PDU Session Authentication Command (see messaging 311). All communication between the SMF-0 217 and the UE 205 takes place via AMF-0 216, although this is not explicitly shown in the figure for clarity of illustration.

At Step 5, the UE 205 responds to the SMF-0 217 with a PDU Session Authentication Complete message that contains an EAP-Response/5G-NAS packet, which in turn contains a Registration Request message for the PLMN and Access-Network parameters (AN-Params) (see messaging 313). Note that the Registration Request message for the PLMN (a second NAS message for the second core network) is embedded into an EAP packet, which in turn is embedded into a PDU Session message for the SNPN (a first NAS message for the first core network). This encapsulation of NAS messages for a second core network into NAS messages for a first core network differentiates the procedure 300 over other CN registration procedures. The SMF-0 217 forwards the EAP-Response/5G-NAS packet to the TNGF 221 (see messaging 315). Subsequently, the TNGF 221 then selects an AMF in the PLMN based on the received AN-Params (see block 317; here, the AMF-1 222 is selected).

Continuing on FIG. 3B, the TNGF 221 forwards the Registration Request to the AMF-1 222 (see messaging 319). The AMF-1 222 decides to authenticate the UE 205, selects an AUSF (here, the AUSF 320 is selected) and sends an HTTP request to the AUSF 320 including the UE's identity (e.g., SUCI) to trigger the authentication procedure (see messaging 321).

At Step 6, a mutual authentication procedure takes place between the UE 205 and the AUSF 320 in the selected PLMN. The AUSF 320 selects to perform this mutual authentication based on the EAP-AKA' authentication method (as shown in the figure) or any other applicable method, according to the UE's subscription data. The AUSF 320 sends to AMF-1 222 the first EAP-AKA' packet (EAP-Request/AKA'-Challenge) encapsulated into an HTTP packet (see messaging 323). The AMF-1 222 encapsulates the EAP-AKA' packet into a NAS Authentication Request message and sends this message to TNGF 221 over the N2 interface (see messaging 325). Next, the TNGF 221 encapsulates the NAS Authentication Request into an EAP-5G packet (EAP-Request/5G-NAS) and forwards it to SMF-0 217 within an AAA Response message (see messaging 327). Finally, the SMF-0 217 forwards the EAP-5G packet to UE 205 within a PDU Session Authentication Command message (see messaging 329). More EAP-AKA' packets can be exchanged between the UE 205 and AUSF 320, encapsulated as discussed above, before the mutual authentication procedure is completed (see messaging 331). Note that while FIG. 3B does not show the AMF-0 216 and 5G-RAN 310, for clarity of illustration, the AMF-0 216 and 5G-RAN 310 relay the messages exchanged between UE 205 and SMF-0 217 as shown in FIG. 3A.

At Step 7, when the EAP-AKA' procedure is successfully completed, the AUSF 320 sends an HTTP response to AMF-1 222 including an EAP-Success packet and the Security Anchor Key (SEAK) key created during the authentication (see messaging 333). The AMF-1 222 encapsulates the EAP-Success packet into a NAS Security Mode Command (SMC) Request message and sends this message to TNGF 221 over the N2 interface (see messaging 335). Next, the TNGF 221 encapsulates the NAS SMC Request into an EAP-5G packet (EAP-Request/5G-NAS) and forwards it to SMF-0 217 within an AAA Response message (see messaging 337). The TNGF 221 includes in the EAP-5G packet its own IP address (TNGF Address) so that the UE 205 can later establish IP connectivity with the TNGF 221. Finally, the SMF-0 217 forwards the EAP-5G packet to UE 205 within a PDU Session Authentication Command message (see messaging 339). At this point, the EAP-AKA' authentication procedure between the UE 205 and the AUSF 320 in the PLMN is successfully completed.

At Step 8, the UE 205 creates a NAS security context to protect subsequent NAS messages exchanged with AMF-1 222 based on the received NAS SMC Request. Then, the UE 205 creates a NAS SMC Complete message, encapsulates the NAS SMC Complete message into an EAP-5G packet and further encapsulates the EAP-5G packet into a PDU Session Authentication Complete message that is sent to SMF-0 217 (see messaging 341). The SMF-0 217 sends the EAP-5G packet to TNGF 221 within a AAA Request (see messaging 343) and the TNGF 221 sends the NAS SMC Complete message to AMF-1 222 over the N2 interface (see messaging 345). At this point, NAS security is established between the UE 205 and AMF-1 222.

At Step 9, the AMF-1 sends an N2 Initial Context Setup Request message to TNGF 221 in order for the TNGF 221 to create a context for this UE 205, including a security context (see messaging 347). The N2 Initial Context Setup Request message includes a TNGF Key (derived from the SEAK key), which should be used by TNGF 221 to secure the communication with the UE 205. The TNGF 221 derives a Trusted Non-3GPP Access Point (TNAP) key, according to the existing procedures, and sends this TNAP key to SMF-0 217 along with another EAP-Success that marks the successful completion of the EAP-5G procedure between the UE 205 and the TNGF 221 (see messaging 349). The SMF-0 217 forwards the TNAP key and the EAP-Success to the UE 205 within a PDU Session Authentication Result message (see messaging 351), which marks the completion of the secondary authentication/authorization procedure. In this embodiment, the UE 205 discards the TNAP key because it is not needed for setting up air-interface security with the SNPN. In other embodiments, however, the TNAP key may be used by the recipient of the PDU Session Authentication Result message (see e.g., the Solution B).

Continuing on FIG. 3C, at Step 10, further steps are executed within the SNPN to complete the PDU Session establishment requested by the UE 205, according to the existing 3GPP specifications (see block 353). During these steps, UPF-0 218 is selected by SMF-0 217 to serve as the user-plane anchor point for the PDU Session. Also, the user-plane of the PDU Session is configured to enforce a certain policy (e.g. QoS policy, charging policy, security policy, etc.) that is decided by a PCF in SNPN.

At Step 11, the UE 205 receives a PDU Session Establishment Accept message at the end of the PDU Session establishment, which may include an IPv4 address or an IPv6 prefix for the UE 205 (see messaging 355 and 357). At this point, the PDU Session 235 is established and enables the UE 205 to establish IP connectivity with the TNGF 221, the address of which was received in step 7d.

All subsequent IP packets exchanged between the UE 205 and the TNGF 221 are exchanged over this PDU Session 235.

At Step 12, the UE 205 creates a signaling IPsec SA with the TNGF 221 (see messaging 359) which operates with NULL encryption, according to the existing procedure for trusted non-3GPP access to 5GC, for example as specified in 3GPP TS 23.502, clause 4.12a. The signaling IPsec SA provides integrity protection only (not encryption) and is established by using the TNGF key as a common key between the UE 205 and the TNGF 221. The TNGF key was received by the TNGF 221 in step 9a and was also created in the UE 205 after the successful EAP-AKA' authentication. In addition, the UE 205 creates a TCP connection to the TNGF 221, in order to transfer NAS messages in a reliable fashion.

At Step 13, after the establishment of the signaling IPsec SA and the TCP connection, the TNGF 221 responds to the AMF-1 222 with an N2 Initial Context Setup Response message (see messaging 361).

At Step 14, the AMF-1 222 accepts the registration request of the UE 205 by sending a Registration Accept message to TNGF 221 within an N2 message (see messaging 363). The TNGF 221 forwards the Registration Accept message to the UE 205 via the established TCP connection and over the signaling IPsec SA (see messaging 365).

At Step 15, the UE 205 responds with a Registration Complete message, which is sent to the TNGF 221 via the established TCP connection and over the signaling IPsec SA (see messaging 367). The TNGF 221 responds to the AMF-1 222 by sending the Registration Complete message within an N2 message (see messaging 369).

By using the above procedure, the UE 205 can register with the 5GC in the selected PLMN during the establishment of a new PDU Session over the SNPN. The SNPN can enforce certain policy for this PDU Session so that the traffic between the UE 205 and the PLMN is handled by SNPN with the appropriate QoS, charging and security rules. This can optimize the communication experience between the UE 205 and PLMN through the SNPN.

In an alternative embodiment, the roles of the SNPN and the PLMN in FIGS. 3A-3C can be interchanged. In other words, it is also possible the apply the principles and the procedure described above in a scenario where the UE 205 is connected to a PLMN (consisting of NG-RAN access and 5GC core network) and uses a PDU Session via the PLMN to connect to an SNPN consisting of at least a 5G core network by using a TNGF in the SNPN. This scenario is beneficial in case when the SNPN coverage is limited and the UE 205 can use the PLMN to access the SNPN services when the UE 205 is outside the SNPN coverage.

Figure 4:
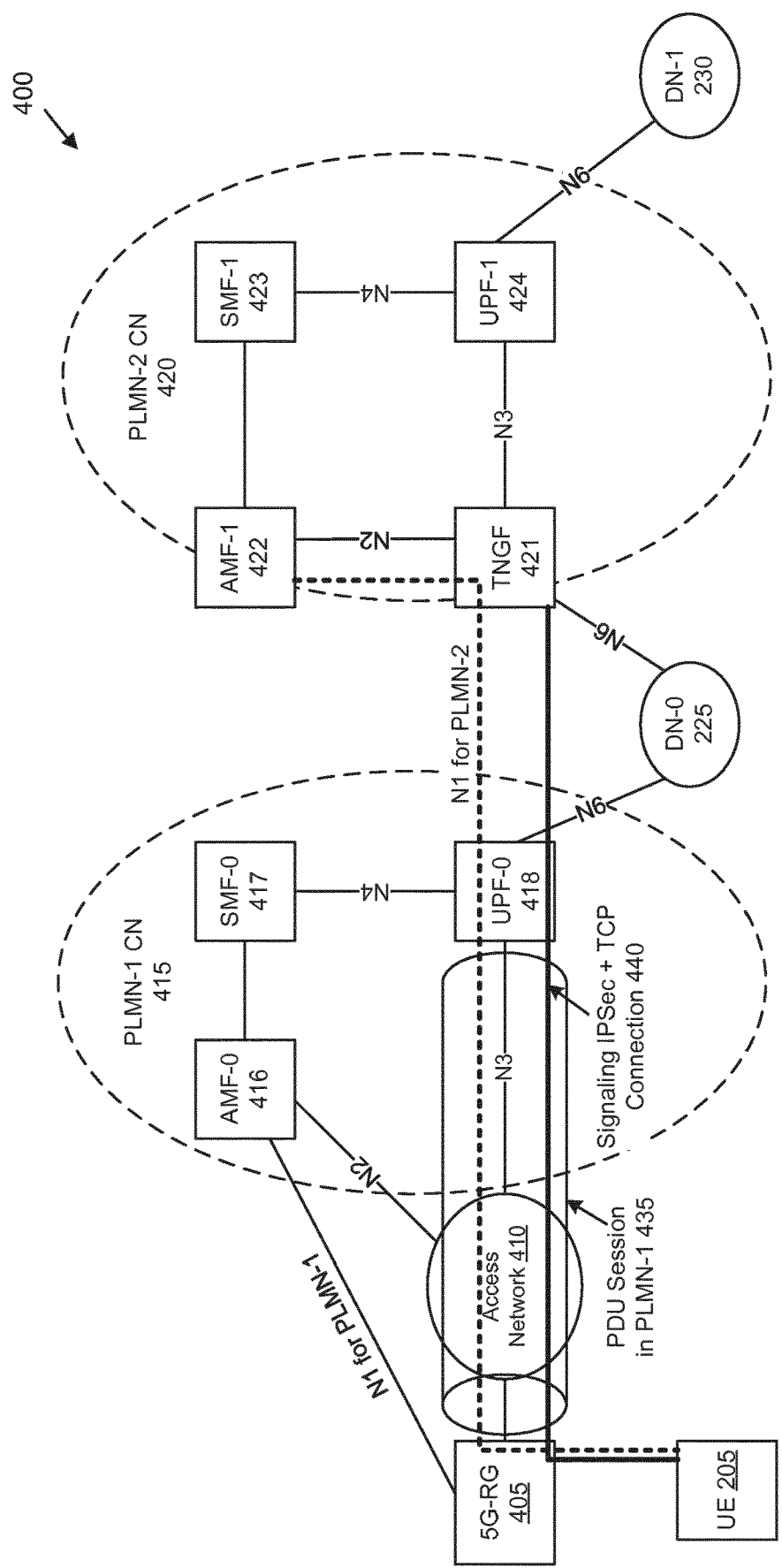
FIG. 4 is a diagram illustrating another embodiment of a network deployment for registering with a mobile network through another mobile network.

FIG. 4 depicts a network deployment 400 comprising a UE 205 which operates behind a 5G-RG 405. The 5G-RG is registered with a first PLMN ("PLMN-1") and the UE 205 connects to a second PLMN ("PLMN-2") via the 5G-RG 405 and its connection to the first PLMN. The PLMN-1 CN 415 includes at least an AMF ("AMF-0" 416), a SMF ("SMF-0" 417), and a UPF ("UPF-0" 418). In various embodiments, the PLMN-1 CN 415 includes additional NFs as described above with reference to FIG. 1. The UE 205 uses the 5G-RG's data connection to the PLMN-1 (e.g., a PDU Session established with the PLMN-1) to register with the PLMN-2 via a TNGF 421 in the PLMN-2 CN 420. The PLMN-2 CN 420 includes at least the TNGF 421, an AMF ("AMF-1" 422), a SMF ("SMF-1" 423), and a UPF ("UPF-1" 424). In various embodiments, the PLMN-2 CN 420 includes additional NFs as described above with reference to FIG. 1. As depicted, the PLMN-1 CN 415 and PLMN-2 CN 420 are connected via a data network ("DN-0" 225). Moreover, after registering with the PLMN-2, the UE 205 may access another data network ("DN-1" 230) via the UPF-1 424.

As depicted, the 5G-RG 405 establishes a data connection (depicted here as a PDU Session 435) with the PLMN-1 via the access network 410 (e.g., a wireline access network). One example of the data connection establishment procedure is described below with reference to FIGS. 5A-5C.

Note that the data connection establishment also initiates registration of the UE 205 with the PLMN-2. After the 5G-RG 405 establishes the data connection with the PLMN-1, the UE 205 establishes an IPSec SA with the TNGF 421 and completes the registration with the PLMN-2. Accordingly, the 5G-RG 405 has an N1 connection with the AMF-0 416 for the PLMN-1, while the UE 205 has an N1 connection with the AMF-1 422 for the PLMN-2.

Figure 5A:
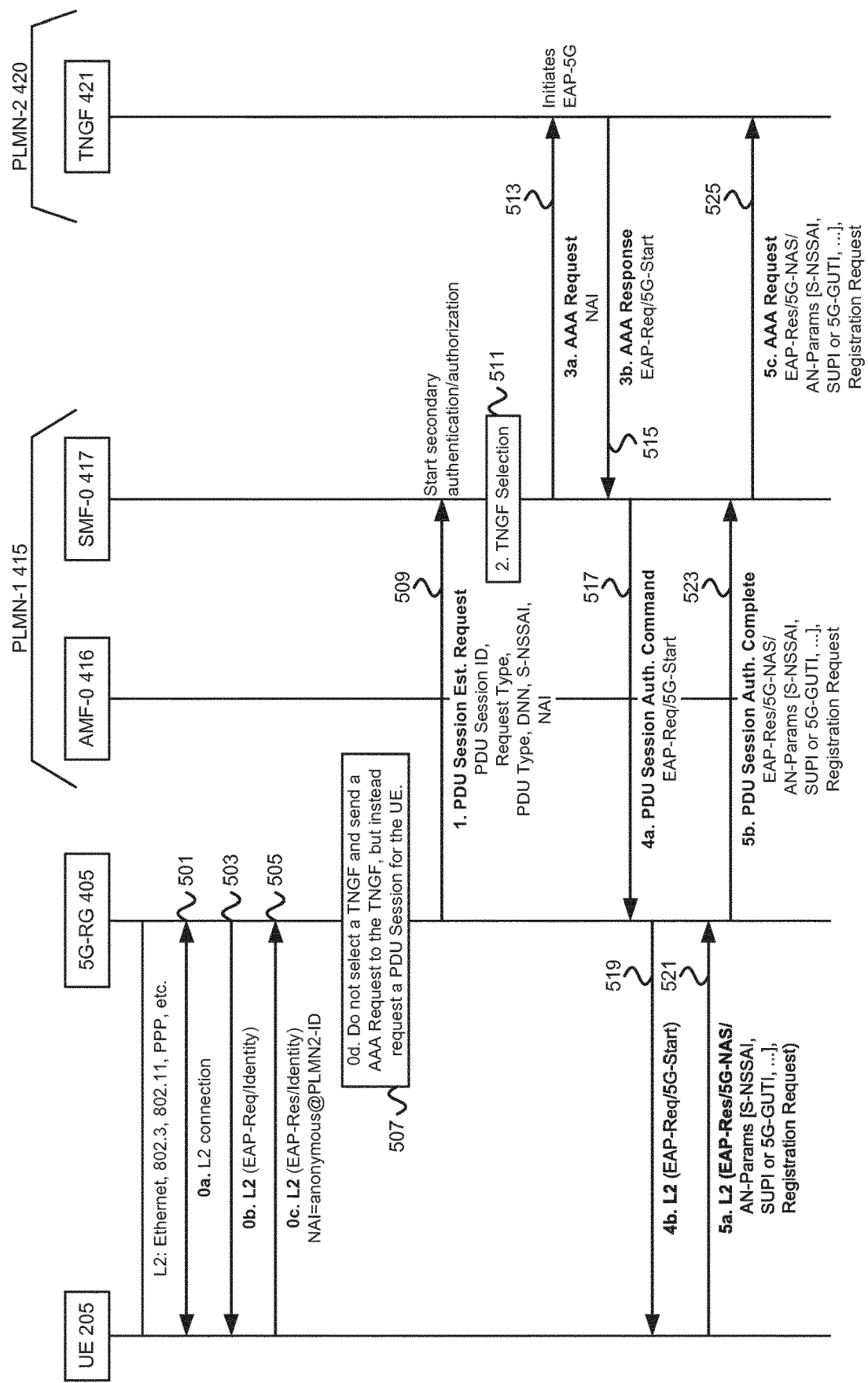
FIG. 5A is a signal flow diagram illustrating one embodiment of a procedure for registering with a PLMN through another PLMN.
Figure 5B:
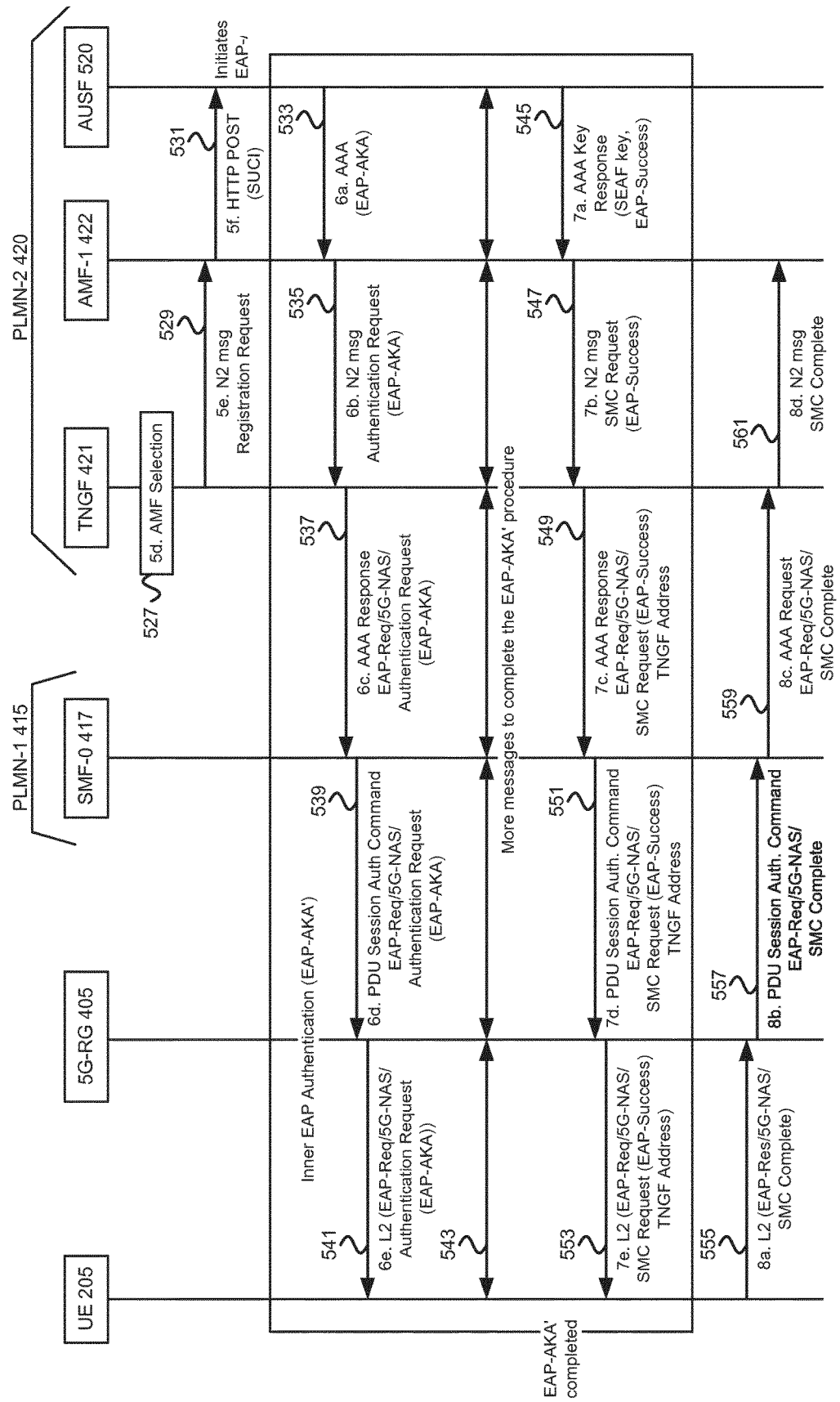
FIG. 5B is a continuation of the procedure depicted in FIG. 5A.
Figure 5C:
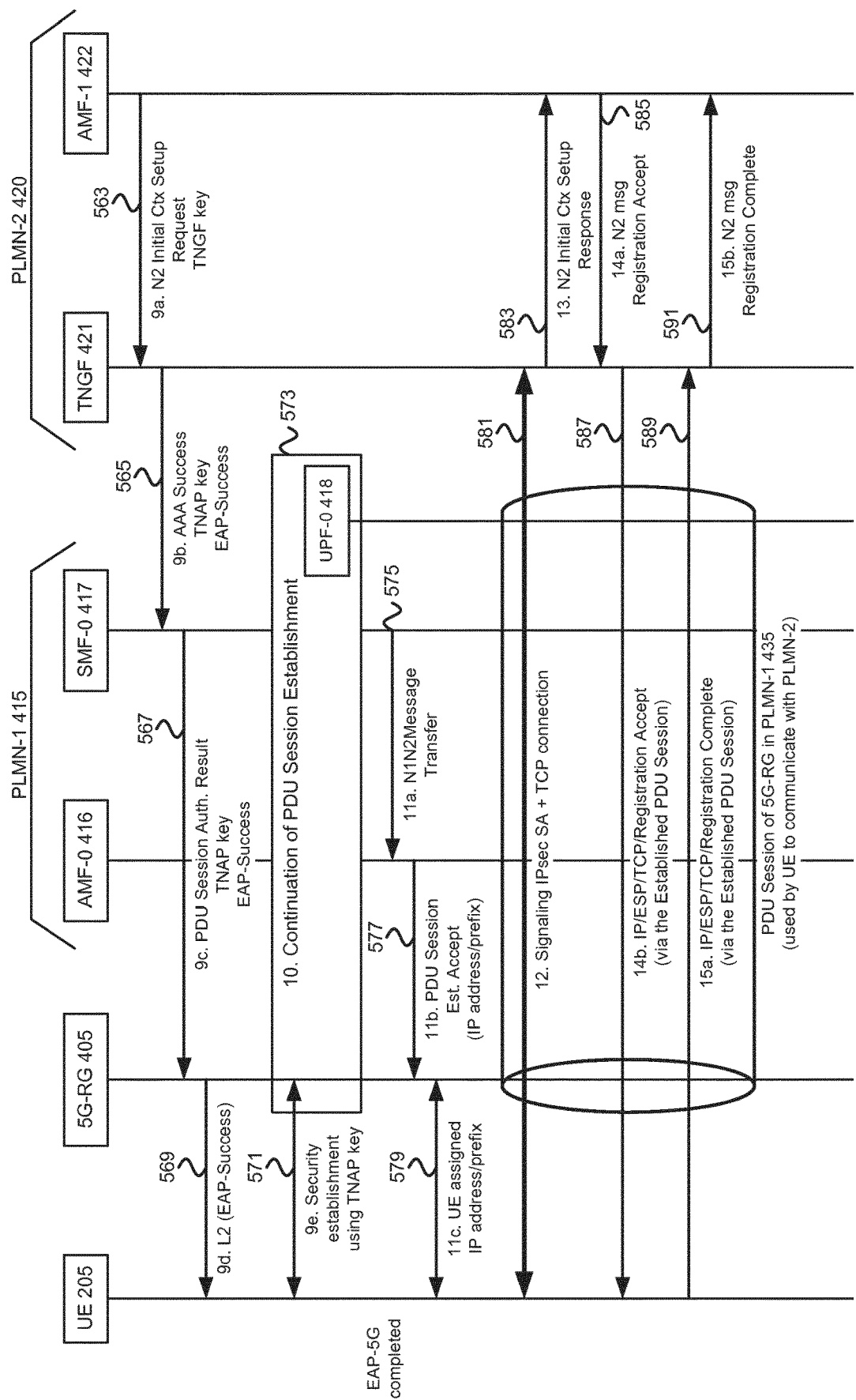
FIG. 5C is a continuation of the procedure depicted in FIGS. 5A-5B.

FIGS. 5A-5C depict a procedure 500 for registering with a mobile network through another mobile network, according to embodiments of the disclosure. The procedure 500 involves the UE 205, the 5G-RG 405, an AMF, SMF, and UPF in a first PLMN ("PLMN-1", these NF are designated "AMF-0" 416, "SMF-0" 417, and "UPF-0" 418, respectively), and a TNGF, AMF, and AUSF in a second PLMN ("PLMN-2", these NF are designated "TNGF" 421, "AMF-1" 422, and "AUSF" 520, respectively). The procedure 500 details signaling flow for the Solution B where the UE 205 is connected to a 5G-Residential Gateway (5G-RG) 405 in PLMN-1 and registers via this 5G-RG 405 with a PLMN-2. The PLMN-1 provides an IP tunnel that enables the communication between the UE and the PLMN-2, in a similar way as the SNPN in the Solution A provides an IP tunnel that enables the communication between the UE 205 and the PLMN.

At FIG. 5A, the procedure 500 begins at Step 0 where the UE 205 decides to connect to a 5G-RG 405 in order e.g. to access some PLMN services in PLMN-2, such as IMS multimedia services, which are not available in the PLMN-1. The UE 205 may take this decision based on some local configuration, or based on the URSP rules provisioned in the UE 205. Note that the 5G-RG 405 is registered with PLMN-1. At step 0a, the UE 205 and 5G-RG 405 establish a L2 connection (see messaging 501). At step 0b, the 5G-RG 405 sends an EAP request to the UE 205 (see messaging 503) and at Step 0c the UE's response includes an NAI of the PLMN-2 (see messaging 505).

The 5G-RG 405 inspects the NAI and determines that the UE 205 wants to register with a 5GC in the PLMN-2. For example, the NAI formatted as NAI=anonymous@nai.5gc.mnc015.mcc234.3gppnetwork.org indicates to the 5G-RG 405 that the UE 205 wants to register with 5GC in a PLMN with MCC=234 and MNC=015. Additionally, the 5G-RG 405 may determine whether the UE 205 should be registered with the PLMN-2 via a data connection (e.g., PDU Session) in the PLMN-1. After determining to register the UE 205 with the PLMN-2 via a data connection in the PLMN-1, the 5G-RG 405 does not select a TNGF and does not send an AAA Request to the selected TNGF, as specified in TS 23.316 (see block 507). Instead, the 5G-RG 405 requests a new PDU Session for the UE 205, which will provide enhanced IP connectivity between the UE 205 and the TNGF 421 (in PLMN-2). This is the advantage of this new PDU Session over the current solution in TS 23.316, which does not establish a new PDU Session for the UE 205. It is assumed that the 5G-RG 405 uses some local configuration data to decide (a) if it will select a TNGF and apply the existing procedure specified in TS 23.316 or (b) if it will request a new PDU Session for the UE 205.

At Step 1, the 5G-RG 405 initiates PDU Session establishment, e.g., as soon as the 5G-RG 405 determines (e.g. in step 0c) that the UE 205 attempts to connect to the 5G-RG 405 in order to register with 5GC in PLMN-2. Again, receiving the NAI triggers the 5G-RG 405 to establish the data connection, if the 5G-RG 405 determines that the UE 205 should be registered with the PLMN-2 via a data connection in the PLMN-1.

During Step 1, the 5G-RG 405 sends a NAS message to AMF-0 416 containing a PDU Session Establishment Request message and indicating PDU Type=IP (e.g. IPv4, IPv6 or IPv4v6) (see messaging 509). The NAS message may also contain a certain DNN and S-NSSAI and contains a Network Access Identifier (NAI) including the identity of the selected PLMN in the realm part. Optionally, the 5G-RG 405 may also include an explicit indication in the PDU Session Establishment Request message indicating that this PDU Session is going to be used for accessing an external PLMN.

At Step 2, when SMF-0 417 receives the PDU Session Establishment Request via AMF-0 416, the SMF-0 417 initiates the secondary authentication/authorization procedure, because the SMF-0 417 receives a NAI from the 5G-RG 405. In one embodiment, the SMF-0 417 implements the secondary authentication/authorization procedure specified in 3GPP TS 23.501, clause 5.6.6. For this purpose, the SMF-0 417 selects a TNGF 421 based on the realm included in the NAI (which contains the PLMN identity of PLMN-2) and based on other parameters, such local configuration (see block 511). From the SMF-0's point of view, the selected TNGF 421 is the same as a DN-AAA server operating in the DN, which the 5G-RG 405 attempts to connect to with the requested PDU Session.

At Step 3, the SMF-0 417 sends an AAA Request message to the selected TNGF 421, which operates as a DN-AAA server (see messaging 513). This message contains the NAI. The TNGF 421 initiates the normal procedure that is applied when a UE requests to connect to 5GC via a trusted non-3GPP access and initiates an EAP authentication procedure with the 5G-RG 405 by applying the EAP-5G authentication method. Hence, the TNGF 421 sends an AAA Response to SMF-0 417 including an EAP-Request/5G-Start packet (see messaging 515).

At Step 4a, the SMF-0 417 forwards the EAP-Request/5G-Start packet to the 5G-RG 405 inside a PDU Session Authentication Command (see messaging 517). All communication between SMF-0 417 and 5G-RG 405 takes place via AMF-0 416, although this is not explicitly shown in the figure for clarity of illustration. At Step 4b, the 5G-RG 405 forwards the EAP-Request/5G-Start packet to the UE 205 (see messaging 519). In the depicted embodiment, the EAP packets exchanged between the UE 205 and the 5G-RG 405 are encapsulated over Layer-2 frames, i.e. over IEEE 802.11 frames.

At Step 5a, the UE 205 responds to the 5G-RG 405 with an EAP-Response/5G-NAS packet which in turn contains a Registration Request message for the PLMN-2 and Access-Network parameters (AN-Params) (see messaging 521). At Step 5b, the 5G-RG 405 responds to SMF-0 417 with the a PDU Session Authentication Complete message that contains the EAP-Response/5G-NAS packet (see messaging 523). Note that the Registration Request message for the PLMN-2 (a second NAS message for the second core network) is embedded into an EAP packet, which in turn is embedded into a PDU Session message for the PLMN-1 (a first NAS message for the first core network). This encapsulation of NAS messages for a second core network into NAS messages for a first core network differentiates the procedure 500 over other CN registration procedures. The SMF-0 417 forwards the EAP-Response/5G-NAS packet to the TNGF 421 (see messaging 525).

Continuing on FIG. 5B, the TNGF 421 then selects an AMF in the PLMN (see block 527; here, the AMF-1 422 is selected) based on the received AN-Params and forwards the Registration Request to AMF-1 422 (see messaging 529).

Subsequently, the AMF-1 422 decides to authenticate the UE 205, selects an AUSF 520 and sends an HTTP request to AUSF 520 including the UE's identity (e.g. SUCI) to trigger the authentication procedure (see messaging 531).

At Step 6, a mutual authentication procedure takes place between the UE 205 and the AUSF 520 in the selected PLMN. The AUSF 520 selects to perform this mutual authentication based on the EAP-AKA' authentication method (as shown in the figure) or any other applicable method, according to the UE's subscription data. The AUSF 520 sends to AMF-1 422 the first EAP-AKA' packet (EAP-Request/AKA'-Challenge) encapsulated into an HTTP packet (see messaging 533). The AMF-1 422 encapsulates the EAP-AKA' packet into a NAS Authentication Request message and sends this message to TNGF 421 over the N2 interface (see messaging 535). Next, the TNGF 421 encapsulates the NAS Authentication Request into an EAP-5G packet (EAP-Request/5G-NAS) and forwards it to SMF-0 417 within an AAA Response message (see messaging 537). The SMF-0 417 forwards the EAP-5G packet to the 5G-RG 405 within a PDU Session Authentication Command message (see messaging 539). Finally, the 5G-RG 405 forwards the EAP-5G packet to the UE 205 within a Layer-2 frame (e.g., IEEE 802.11 frame) (see messaging 541). More EAP-AKA' packets can be exchanged between the UE 205 and AUSF 520, encapsulated as discussed above, before the mutual authentication procedure is completed (see messaging 543). Note that while FIG. 5B does not show the AMF-0 416 for clarity of illustration, the AMF-0 416 relays the messages exchanged between 5G-RG 405 and SMF-0 417 as shown in FIG. 5A.

At Step 7, when the EAP-AKA' procedure is successfully completed, the AUSF 520 sends an HTTP response to AMF-1 422 including an EAP-Success packet and the Security Anchor Key (SEAK) key created during the authentication (see messaging 545). The AMF-1 422 encapsulates the EAP-Success packet into a NAS Security Mode Command (SMC) Request message and sends this message to TNGF 421 over the N2 interface (see messaging 547). Next, the TNGF 421 encapsulates the NAS SMC Request into an EAP-5G packet (EAP-Request/5G-NAS) and forwards it to SMF-0 417 within an AAA Response message (see messaging 549). The TNGF 421 includes in the EAP-5G packet its own IP address (TNGF Address) so that the UE 205 can later establish IP connectivity with the TNGF 421. The SMF-0 417 forwards the EAP-5G packet to the 5G-RG 405 within a PDU Session Authentication Command message (see messaging 551). Finally, the 5G-RG 405 forwards the EAP-5G packet to the UE 205 within a Layer-2 frame (see messaging 553). At this point, the EAP-AKA' authentication procedure between the UE 205 and the AUSF 520 in the PLMN is successfully completed.

At Step 8, the UE 205 creates a NAS security context to protect subsequent NAS messages exchanged with the AMF-1 422 based on the received NAS SMC Request. Then, the UE 205 creates a NAS SMC Complete message, encapsulates the NAS SMC Complete message into an EAP-5G packet and further encapsulates the EAP-5G packet into a Layer-2 frame that is sent to the 5G-RG 405 (see messaging 555). The 5G-RG 405 encapsulates the EAP-5G packet into a PDU Session Authentication Complete message that is sent to SMF-0 417 (see messaging 557). The SMF-0 417 sends the EAP-5G packet to the TNGF 421 within a AAA Request (see messaging 559) and the TNGF 421 sends the NAS SMC Complete message to the AMF-1

422 over the N2 interface (see messaging 561). At this point, NAS security is established between the UE 205 and the AMF-1 422.

Continuing on FIG. 5C, at Step 9, the AMF-1 422 sends an N2 Initial Context Setup Request message to the TNGF 421 in order for the TNGF 421 to create a context for this UE 205, including a security context (see messaging 563). The N2 Initial Context Setup Request message includes a TNGF Key (derived from the SEAK key), which should be used by the TNGF 421 to secure the communication with the UE 205. The TNGF 421 derives a Trusted Non-3GPP Access Point (TNAP) key, according to the existing procedures, and sends this TNAP key to SMF-0 417 along with another EAP-Success that marks the successful completion of the EAP-5G procedure between the UE 205 and the TNGF 421 (see messaging 565). The SMF-0 417 forwards the TNAP key and the EAP-Success to the 5G-RG within a PDU Session Authentication Result message, which marks the completion of the secondary authentication/authorization procedure (see messaging 567). The 5G-RG 405 forwards the EAP-Success message to the UE 205 (see messaging 569). Unlike the procedure 300, the TNAP key is not discarded by the 5G-RG 405 (as was done by the UE in Solution A) but it is used to setup air-interface security with the UE 205 (in step 9e, see messaging 571). Note that the TNAP key is also created in the UE 205 during the EAP-AKA' procedure.

At Step 10, further steps are executed within the PLMN-1 to complete the PDU Session establishment requested by the 5G-RG 405, e.g., according to the existing 3GPP specifications (see block 573). During these steps, the UPF-0 418 is selected by the SMF-0 417 to serve as the user-plane anchor point for the PDU Session. Also, the user-plane of the PDU Session is configured to enforce a certain policy (e.g. QoS policy, charging policy, security policy, etc.) that is decided by a PCF in PLMN-1.

At Step 11, the 5G-RG 405 receives a PDU Session Establishment Accept message at the end of the PDU Session establishment, which may include an IPv4 address or an IPv6 prefix for the UE 205 (see messaging 575 and 577). Now, the PDU Session is established and enables the UE 205 to establish IP connectivity with the TNGF 421, the address of which was received in step 7e. The 5G-RG 405 sends the UE 205 the assigned IP address or prefix (see messaging 579). After the PDU Session requested by 5G-RG 405 is established (in step 11), the 5G-RG 405 is configured to transfer all UE traffic via this PDU Session. Hence, the 5G-RG 405 tunnels all UE traffic to UPF-0 418, which then forwards the traffic to the TNGF 421 in the PLMN-2 based on the IP destination address.

At Step 12, the UE 205 creates a signaling IPsec SA 440 with the TNGF, according to the existing procedure for trusted non-3GPP access to 5GC, for example as specified in 3GPP TS 23.502, clause 4.12a (see messaging 581). Unlike the procedure 300, here the signaling IPsec SA 440 provides both integrity protection and encryption and is established by using the TNGF key as a common key between the UE 205 and the TNGF 421. The TNGF key was received by the TNGF 421 in step 9a and was also created in the UE 205 after the successful EAP-AKA' authentication. In addition, the UE 205 creates a TCP connection to the TNGF 421, in order to transfer NAS messages in a reliable fashion.

At Step 13, after the establishment of the signaling IPsec SA and the TCP connection, the TNGF 421 responds to AMF-1 422 with an N2 Initial Context Setup Response message (see messaging 583).

At Step 14, the AMF-1 422 accepts the registration request of UE 205 by sending a Registration Accept message to TNGF 421 within an N2 message (see messaging 585). The TNGF 421 forwards the Registration Accept message to UE 205 via the established TCP connection and over the signaling IPsec SA (see messaging 587).

At Step 15, the UE 205 responds with a Registration Complete message, which is sent to TNGF 421 via the established TCP connection and over the signaling IPsec SA (see messaging 589). The TNGF 421 responds to the AMF-1 422 by sending the Registration Complete message within an N2 message (see messaging 591). The procedure 500 ends and the UE 205 is able to access services in the PLMN-2.

Figure 6:
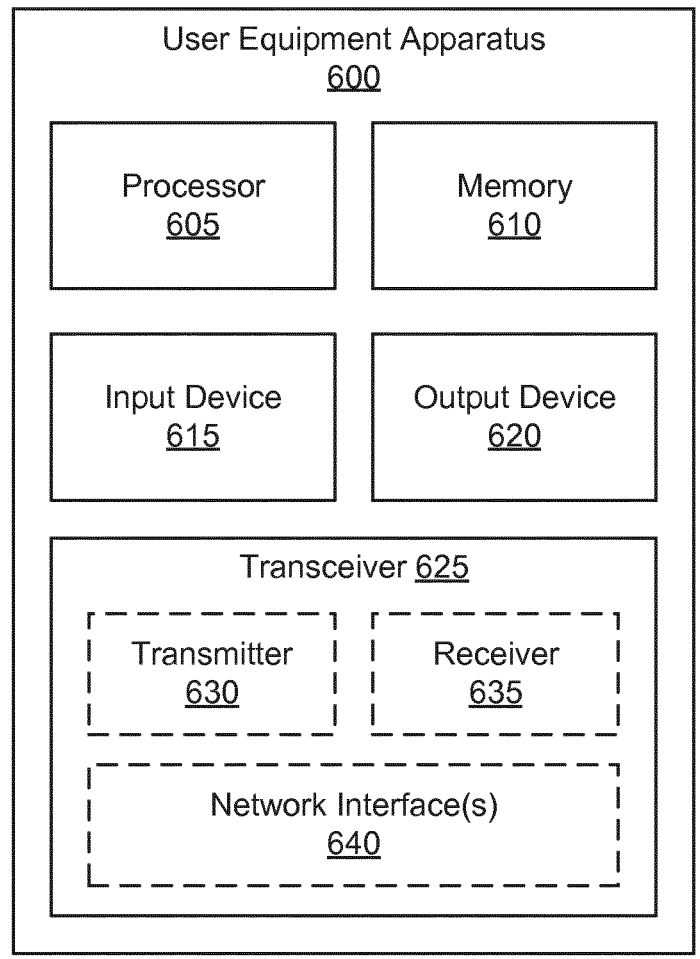
FIG. 6 is a block diagram illustrating one embodiment of a user equipment apparatus for registering with a mobile network through another mobile network.

FIG. 6 depicts one embodiment of a user equipment apparatus 600 that may be used for registering with a mobile network through another mobile network, according to embodiments of the disclosure. The user equipment apparatus 600 may be one embodiment of the remote unit 105 and/or the UE 205. Furthermore, the user equipment apparatus 600 may include a processor 605, a memory 610, an input device 615, an output device 620, a transceiver 625. In some embodiments, the input device 615 and the output device 620 are combined into a single device, such as a touch screen. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 5GC) via an access network. Additionally, the transceiver 625 may support at least one network interface 640. Here, the at least one network interface 640 facilitates communication with an eNB or gNB (e.g., using the "Uu" interface). Additionally, the at least one network interface 640 may include an interface used for communications with an AMF, an SMF, and/or a UPF.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 determines to register with a second mobile communication network via the first mobile communication network. Here, it is assumed that the user equipment apparatus 600 is already registered with the first mobile communication network. The processor 605 controls the transceiver 625 to send a request to establish a data connection (e.g., PDU Session) with the first mobile communication network. Here, the request including an identifier (e.g., NAI) of a second mobile communication network.

The processor 605 receives a command from the first mobile communication network (e.g., using the transceiver 625), the command initiating an authentication procedure (e.g., Secondary authentication for the PDU Session) with the first mobile communication network and a registration procedure for registering the apparatus with the second mobile communication network.

The processor 605 exchanges a plurality of authentication messages (e.g., PDU Session Authentication Command/Complete messages) with the first mobile communication network, wherein each of the plurality of authentication messages contains a signaling message (e.g. Registration Request, SMC Request) for registering the apparatus with the second mobile communication network. The processor 605 completes the registration with the second mobile communication network via the data connection in response to successfully establishing the data connection.

In some embodiments, the requested data connection with the first mobile communication network is established in response to successfully authenticating with the second mobile communication network. In various embodiments, the registration with the second network includes an authentication (e.g., EAP-5G) with the second network.

In some embodiments, the processor 605 establishes a signaling IPSec security association (SA) with a gateway function in the second mobile communication network in response to successfully establishing the data connection. In certain embodiments, the processor 605 receives a network address of the gateway function during the exchange of authentication messages. In certain embodiments, the IPSec SA operates with null encryption. In such embodiments, the processor 605 creates a NAS security context in response to receiving a security mode command from the second mobile communication network during the establishment of the data connection, wherein the NAS security context is applied for protecting signaling messages between the apparatus and the second mobile communication network.

In some embodiments, determining to register with the second mobile communication network via the first mobile communication network comprises receiving an internal indication based on one of: route selection policy rules and a local configuration. In some embodiments, exchanging the plurality of authentication messages with the first mobile communication network comprises embedding registration procedure messages for the second mobile communication network within secondary authentication procedure messages for the first mobile communication network.

In some embodiments, exchanging the plurality of authentication messages with the first mobile communication network comprises embedding NAS messages for the second mobile communication network within NAS messages for the first mobile communication network. In some embodiments, the request comprises information indicating to the first network that the data connection is for registration with a second network.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to registering with a mobile network through another mobile network, for example storing security contexts, IP addresses, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one or more common control signals or as modular transmitters 630 and receivers 635 implemented in the same hardware chip or in a multi-chip module.

Figure 7:
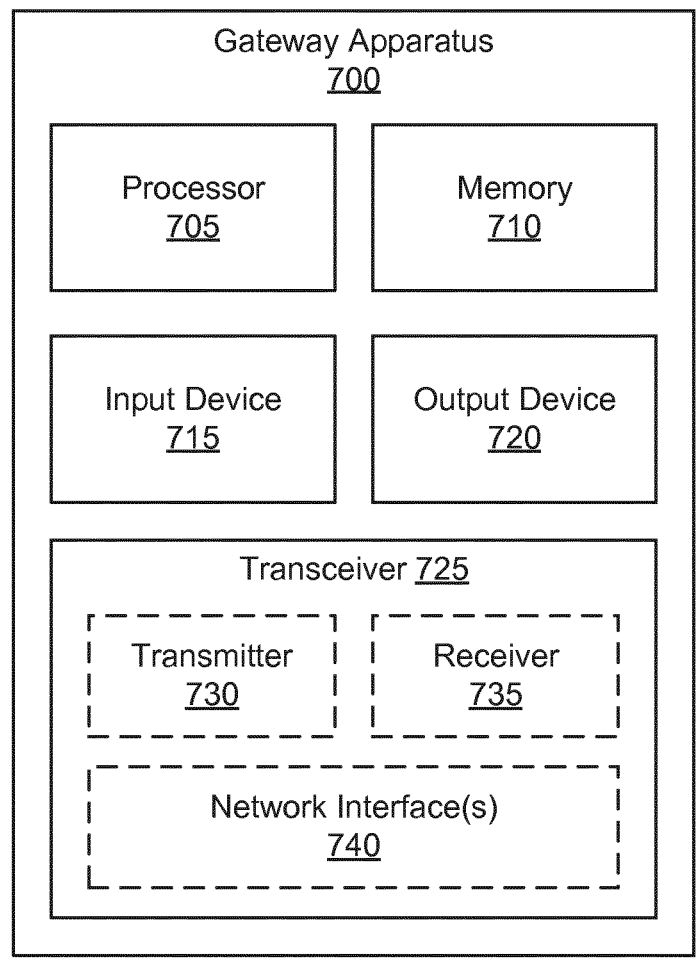
FIG. 7 is a block diagram illustrating one embodiment of a gateway apparatus for registering with a mobile network through another mobile network.

FIG. 7 depicts one embodiment of a gateway apparatus 700 that may be used for registering with a mobile network through another mobile network, according to embodiments of the disclosure. In some embodiments, the gateway apparatus 700 may be one embodiment of a 5G-RG. Furthermore, gateway apparatus 700 may include a processor 705, a memory 710, an input device 715, an output device 720, a transceiver 725. In some embodiments, the input device 715 and the output device 720 are combined into a single device, such as a touch screen. In certain embodiments, the gateway apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740, such as the N1 interface depicted in FIG. 4. In some embodiments, the transceiver 725 supports a first interface for communicating with a RAN node, a second interface for communicating with one or more network functions in a mobile core network (e.g., a 5GC) and a third interface for communicating with a remote unit (e.g., UE).

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the first transceiver 725.

In various embodiments, the processor 705 receives a network access identifier ("NAI") from a UE attempting to connect to the apparatus wherein the NAI includes an identity of a second mobile communication network. Here, it is assumed that the gateway apparatus 700 is already registered with the first mobile communication network when the NAI is received from the UE. The processor 705 controls the transceiver 725 to send a request to establish a data connection (e.g., PDU Session) with the first mobile communication network, the request including the identity (e.g., NAI) of the second mobile communication network.

The processor 705 receives a command from the first mobile communication network (i.e., using the transceiver 725). Here, the command initiates an authentication procedure (e.g., EAP-5G) with the first mobile communication network and a registration procedure for registering the UE with the second mobile communication network. In response, the processor 705 exchanges a plurality of authentication messages (e.g., PDU Session Authentication Command/Complete messages) with the first mobile communication network, wherein each of the plurality of authentication messages contains a signaling message (e.g., Registration Request, SMC Request) for registering the UE with the second mobile communication network.

The processor 705 receives (via the transceiver) an accept message indicating that the data connection with the first mobile communication network is successfully established in response to successful authentication of the UE with the second mobile communication network, wherein the processor 705 completes the registration with the second mobile communication network via the data connection.

In some embodiments, the request is sent in response to the processor determining that the UE is to be registered with the second mobile communication network via a data connection with the first mobile communication network. In some embodiments, the request contains information indicating to the first network that the data connection is for registration with a second network.

In some embodiments, exchanging the plurality of authentication messages with the first mobile communication network comprises embedding registration procedure messages for the second mobile communication network within secondary authentication procedure messages for the first mobile communication network. In some embodiments, exchanging the plurality of authentication messages with the first mobile communication network comprises embedding NAS messages for the second mobile communication network within NAS messages for the first mobile communication network.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to registering with a mobile network through another mobile network, for example storing security contexts, IP addresses, UE contexts, and the like. In certain embodiments, the memory 710 also stores program code and related data, such as an operating system ("OS") or other controller algorithms operating on the gateway apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more interworking functions that provide access to one or more PLMNs. The transceiver 725 may also communicate with one or more network functions (e.g., in the mobile core network 140). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

Figure 8:
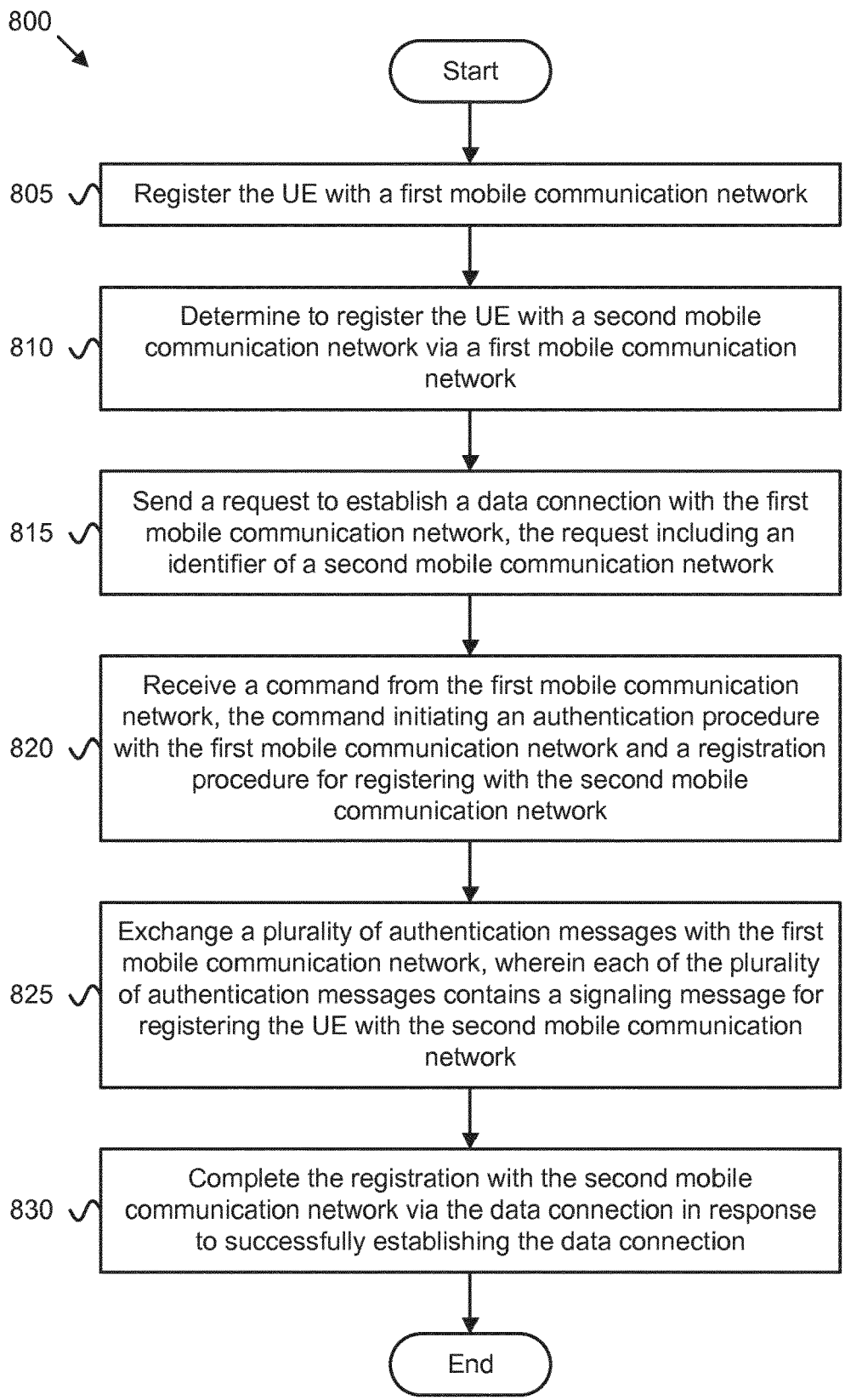
FIG. 8 is a flow chart diagram illustrating one embodiment of a first method for registering with a mobile network through another mobile network.

FIG. 8 depicts a method 800 for registering with a mobile network through another mobile network, according to embodiments of the disclosure. In some embodiments, the method 800 is performed by a UE, such as the remote unit 105, the UE 205 and/or the user equipment apparatus 600. In certain embodiments, the method 800 may be performed by a processor executing program code, for example, a microcontroller, a microprocessor, a CPU, a GPU, an auxiliary processing unit, a FPGA, or the like.

The method 800 begins and registers 805 the UE with a first mobile communication network. The method 800 includes determining 810 to register the UE with a second mobile communication network via a first mobile communication network.

The method 800 includes sending 815 a request to establish a data connection with the first mobile communication network, the request including an identifier of a second mobile communication network. The method 800 includes receiving 820 a command from the first mobile communication network, the command initiating an authentication procedure with the first mobile communication network and a registration procedure for registering with the second mobile communication network.

The method 800 includes exchanging 825 a plurality of authentication messages with the first mobile communication network, wherein each of the plurality of authentication messages contains a signaling message for registering the UE with the second mobile communication network. The method 800 includes completing 830 the registration with the second mobile communication network via the data connection in response to successfully establishing the data connection. The method 800 ends.

Figure 9:
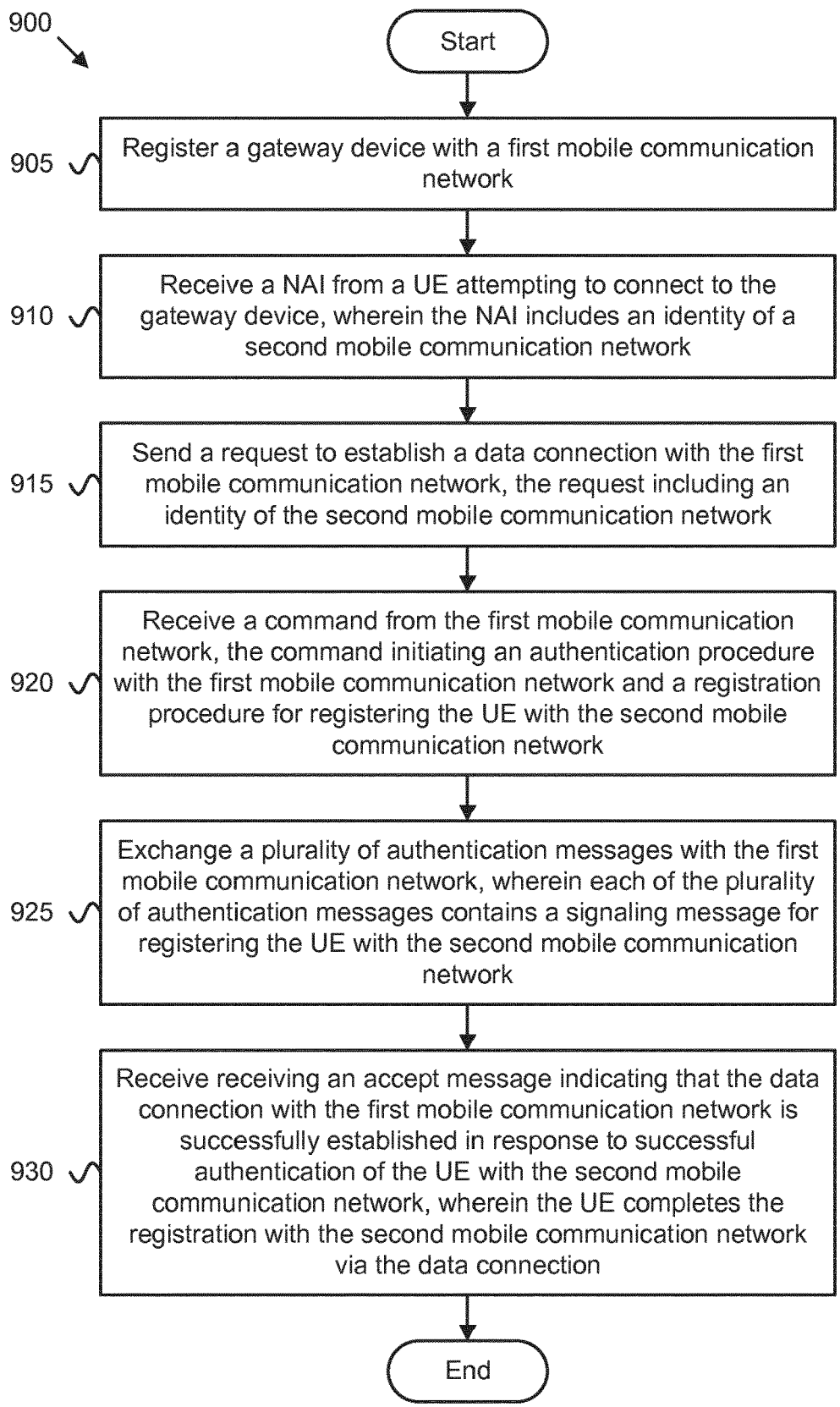
FIG. 9 is a flow chart diagram illustrating one embodiment of a second method for registering with a mobile network through another mobile network.

FIG. 9 depicts a method 900 for registering with a mobile network through another mobile network, according to embodiments of the disclosure. In some embodiments, the method 900 is performed by a gateway device, such as the 5G-RG 405 and/or the gateway apparatus 700. In certain embodiments, the method 900 may be performed by a processor executing program code, for example, a microcontroller, a microprocessor, a CPU, a GPU, an auxiliary processing unit, a FPGA, or the like.

The method 900 begins and registers 905 a gateway device with a first mobile communication network. The method 900 includes receiving 910 a NAI from a UE attempting to connect to the gateway device, wherein the NAI includes an identity of a second mobile communication network.

The method 900 includes sending 915 a request to establish a data connection with the first mobile communication network, the request including an identity of the second mobile communication network. The method 900 includes receiving 920 a command from the first mobile communication network, the command initiating an authentication procedure with the first mobile communication network and a registration procedure for registering the UE with the second mobile communication network.

The method 900 includes exchanging 925 a plurality of authentication messages with the first mobile communication network, wherein each of the plurality of authentication messages contains a signaling message for registering the UE with the second mobile communication network. The method 900 includes receiving 930 an accept message indicating that the data connection with the first mobile communication network is successfully established in response to successful authentication of the UE with the second mobile communication network, wherein the UE completes the registration with the second mobile communication network via the data connection. The method 900 ends.

Disclosed herein is a first apparatus for registering with a mobile network through another mobile network, according to embodiments of the disclosure. The first apparatus may be implemented by a UE, such as the remote unit 105, the UE 205 and/or the user equipment apparatus 600. The first apparatus includes a processor and a transceiver that communicates with a first mobile communication network, wherein the apparatus is registered with the first mobile communication network. The processor determines to register with a second mobile communication network via the first mobile communication network and sends a request to establish a data connection (e.g., a PDU Session) with the first mobile communication network, the request including an identifier (e.g., NAI) of a second mobile communication network. The processor receives a command from the first mobile communication network, the command initiating an authentication procedure (e.g., Secondary authentication for the data connection) with the first mobile communication network and a registration procedure (e.g., EAP-5G) for registering the apparatus with the second mobile communication network. The processor exchanges a plurality of authentication messages (e.g., PDU Session Auth Command/Complete message) with the first mobile communication network. Here, each of the plurality of authentication messages contains a signaling message (e.g., a Registration Request, a SMC Request, etc.) for registering the apparatus with the second mobile communication network. The processor completes the registration with the second mobile communication network via the data connection in response to successfully establishing the data connection.

In some embodiments, the requested data connection with the first mobile communication network is established in response to successfully authenticating with the second mobile communication network. In such embodiments, the registration with the second network includes an authentication with the second network.

In some embodiments, the processor establishes a signaling Internet Protocol Security ("IPSec") security association with a gateway function in the second mobile communication network in response to successfully establishing the data connection. In one embodiment, the processor receives a network address of the gateway function during the exchange of authentication messages. In further embodiments, the IPSec security association operates with null encryption. In such embodiments, the processor may create a non-access stratum security context in response to receiving a security mode command from the second mobile communication network during the establishment of the data connection, wherein the security context is applied for protecting signaling messages between the apparatus and the second mobile communication network.

In some embodiments, determining to register with the second mobile communication network via the first mobile communication network comprises receiving an internal indication based on one of: route selection policy rules and a local configuration. In some embodiments, the request comprises information indicating to the first network that the data connection is for registration with a second network.

In some embodiments, exchanging the plurality of authentication messages with the first mobile communication network comprises embedding registration procedure messages for the second mobile communication network within secondary authentication procedure messages for the first mobile communication network. In some embodiments, exchanging the plurality of authentication messages with the first mobile communication network comprises embedding non-access stratum ("NAS") messages for the second mobile communication network within NAS messages for the first mobile communication network.

Disclosed herein is a first method for registering with a mobile network through another mobile network. The first method may be performed by a UE, such as the remote unit 105, the UE 205 and/or the user equipment apparatus 600. The first method includes registering the UE with a first mobile communication network and determining to register the UE with a second mobile communication network via a first mobile communication network. The method includes sending a request to establish a data connection with the first mobile communication network, the request including an identifier of a second mobile communication network, and receiving a command from the first mobile communication network, the command initiating an authentication procedure with the first mobile communication network and a registration procedure for registering with the second mobile communication network. The method includes exchanging a plurality of authentication messages with the first mobile communication network, wherein each of the plurality of authentication messages contains a signaling message for registering the UE with the second mobile communication network, and completing the registration with the second mobile communication network via the data connection in response to successfully establishing the data connection.

In some embodiments of the first method, the requested data connection with the first mobile communication network is established in response to successfully authenticating with the second mobile communication network. In such embodiments, the registration with the second network includes an authentication with the second network.

In some embodiments, the first method includes establishing a signaling Internet Protocol Security ("IPSec") security association with a gateway function in the second mobile communication network in response to successfully establishing the data connection. In one embodiment, the first method includes receiving a network address of the gateway function during the exchange of authentication messages. In further embodiments, the IPSec security association operates with null encryption. In such embodiments, the first method may include creating a non-access stratum security context in response to receiving a security mode command from the second mobile communication network during the establishment of the data connection, wherein the security context is applied for protecting signaling messages between the apparatus and the second mobile communication network.

In some embodiments of the first method, determining to register with the second mobile communication network via the first mobile communication network comprises receiving an internal indication based on one of: route selection policy rules and a local configuration. In some embodiments of the first method, the request comprises information indicating to the first network that the data connection is for registration with a second network.

In some embodiments of the first method, exchanging the plurality of authentication messages with the first mobile communication network comprises embedding registration procedure messages for the second mobile communication network within secondary authentication procedure messages for the first mobile communication network. In some embodiments of the first method, exchanging the plurality of authentication messages with the first mobile communication network comprises embedding non-access stratum ("NAS") messages for the second mobile communication network within NAS messages for the first mobile communication network.

Disclosed herein is a second apparatus for registering with a mobile network through another mobile network. The second apparatus may be implemented performed by a gateway device, such as the 5G-RG 405 and/or the gateway apparatus 700. The second apparatus includes a processor and a transceiver that communicates with a first mobile communication network, wherein the apparatus is registered with the first mobile communication network. The processor receives a network access identifier ("NAI") from a UE attempting to connect to the apparatus wherein the NAI includes an identity of a second mobile communication network and sends a request to establish a data connection with the first mobile communication network, the request including the identity (e.g., NAI) of the second mobile communication network. The processor receives a command from the first mobile communication network, the command initiating an authentication procedure (e.g., EAP-5G) with the first mobile communication network and a registration procedure for registering the UE with the second mobile communication network and exchanges a plurality of authentication messages (e.g., PDU Session Auth Command/Complete messages) with the first mobile communication network, wherein each of the plurality of authentication messages contains a signaling message (e.g. Registration Request, SMC Request) for registering the UE with the second mobile communication network. The processor receives an accept message indicating that the data connection with the first mobile communication network is successfully established in response to successful authentication of the UE with the second mobile communication network, wherein the UE completes the registration with the second mobile communication network via the data connection.

In some embodiments, the request is sent in response to the processor determining that the UE is to be registered with the second mobile communication network via a data connection with the first mobile communication network. In some embodiments, the request comprises information indicating to the first network that the data connection is for registration with a second network.

In some embodiments, exchanging the plurality of authentication messages with the first mobile communication network comprises embedding registration procedure messages for the second mobile communication network within secondary authentication procedure messages for the first mobile communication network.

In some embodiments, exchanging the plurality of authentication messages with the first mobile communication network comprises embedding non-access stratum ("NAS") messages for the second mobile communication network within NAS messages for the first mobile communication network.

Disclosed herein is a second method for registering with a mobile network through another mobile network. The second method may be performed by a gateway device, such as the 5G-RG 405 and/or the gateway apparatus 700. The second method includes registering a gateway device with a first mobile communication network and receiving a network access identifier ("NAI") from a UE attempting to connect to the gateway device wherein the NAI includes an identity of a second mobile communication network. The method includes sending a request to establish a data connection with the first mobile communication network, the request including an identity of the second mobile communication network and receiving a command from the first mobile communication network, the command initiating an authentication procedure with the first mobile communication network and a registration procedure for registering the UE with the second mobile communication network. The method includes exchanging a plurality of authentication messages with the first mobile communication network, wherein each of the plurality of authentication messages contains a signaling message for registering the UE with the second mobile communication network, and receiving an accept message indicating that the data connection with the first mobile communication network is successfully established in response to successful authentication of the UE with the second mobile communication network, wherein the UE completes the registration with the second mobile communication network via the data connection.

In some embodiments, the request is sent in response to the processor determining that the UE is to be registered with the second mobile communication network via a data connection with the first mobile communication network. In some embodiments, the request comprises information indicating to the first network that the data connection is for registration with a second network.

In some embodiments, exchanging the plurality of authentication messages with the first mobile communication network comprises embedding registration procedure messages for the second mobile communication network within secondary authentication procedure messages for the first mobile communication network.

In some embodiments, exchanging the plurality of authentication messages with the first mobile communication network comprises embedding non-access stratum ("NAS") messages for the second mobile communication network within NAS messages for the first mobile communication network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a transceiver that communicates with a first mobile communication network, wherein the apparatus is registered with the first mobile communication network; and
   a processor that:
   determines to register with a second mobile communication network via the first mobile communication network;
   sends a request to establish a data connection with the first mobile communication network, the request including an identifier of the second mobile communication network;
   receives a command from the first mobile communication network, the command initiating an authentication procedure with the first mobile communication network and a registration procedure for registering the apparatus with the second mobile communication network;
   exchanges a plurality of authentication messages with the first mobile communication network, wherein each of the plurality of authentication messages contains a signaling message for registering the apparatus with the second mobile communication network; and
   completes the registration with the second mobile communication network via the data connection in response to successfully establishing the data connection.

2. The apparatus of claim 1, wherein the requested data connection with the first mobile communication network is established in response to successfully authenticating with the second mobile communication network.

3. The apparatus of claim 1, wherein the processor establishes a signaling Internet Protocol Security ("IPSec") security association with a gateway function in the second mobile communication network in response to successfully establishing the data connection.

4. The apparatus of claim 3, wherein the processor receives a network address of the gateway function during the exchange of authentication messages.

5. The apparatus of claim 3, wherein the IPSec security association operates with null encryption.

6. The apparatus of claim 5, wherein the processor creates a non-access stratum ("NAS") security context in response to receiving a security mode command from the second mobile communication network during the establishment of the data connection, wherein the NAS security context is applied for protecting signaling messages between the apparatus and the second mobile communication network.

7. The apparatus of claim 1, wherein determining to register with the second mobile communication network via the first mobile communication network comprises receiving an internal indication based on one of: route selection policy rules and a local configuration.

8. The apparatus of claim 1, wherein exchanging the plurality of authentication messages with the first mobile communication network comprises embedding registration procedure messages for the second mobile communication network within secondary authentication procedure messages for the first mobile communication network.

9. The apparatus of claim 1, wherein exchanging the plurality of authentication messages with the first mobile communication network comprises embedding non-access stratum ("NAS") messages for the second mobile communication network within NAS messages for the first mobile communication network.

10. The apparatus of claim 1, wherein the request comprises information indicating to the first mobile communication network that the data connection is for registration with a second mobile communication network.

11. A method of a UE comprising:
registering the UE with a first mobile communication network;
determining to register the UE with a second mobile communication network via a first mobile communication network;
sending a request to establish a data connection with the first mobile communication network, the request including an identifier of the second mobile communication network;
receiving a command from the first mobile communication network, the command initiating an authentication procedure with the first mobile communication network and a registration procedure for registering with the second mobile communication network;
exchanging a plurality of authentication messages with the first mobile communication network, wherein each of the plurality of authentication messages contains a signaling message for registering the UE with the second mobile communication network; and
completing the registration with the second mobile communication network via the data connection in response to successfully establishing the data connection.

12. The method of claim 11, further comprising establishing a signaling Internet Protocol Security ("IPSec") security association with a gateway function in the second mobile communication network in response to successfully establishing the data connection, wherein the IPSec security association is operated with null encryption.

13. The method of claim 11, wherein exchanging the plurality of authentication messages with the first mobile communication network comprises embedding registration procedure messages for the second mobile communication network within secondary authentication procedure messages for the first mobile communication network.

14. The method of claim 11, wherein exchanging the plurality of authentication messages with the first mobile communication network comprises embedding non-access stratum ("NAS") messages for the second mobile communication network within NAS messages for the first mobile communication network.

15. An apparatus comprising:
a transceiver that communicates with a first mobile communication network, wherein the apparatus is registered with the first mobile communication network; and
a processor that:
receives a network access identifier ("NAI") from a UE attempting to connect to the apparatus wherein the NAI includes an identity of a second mobile communication network;
sends a request to establish a data connection with the first mobile communication network, the request including the identity of the second mobile communication network;
receives a command from the first mobile communication network, the command initiating an authentication procedure with the first mobile communication network and a registration procedure for registering the UE with the second mobile communication network;
exchanges a plurality of authentication messages with the first mobile communication network, wherein each of the plurality of authentication messages contains a signaling message for registering the UE with the second mobile communication network; and
receives an accept message indicating that the data connection with the first mobile communication network is successfully established in response to successful authentication of the UE with the second mobile communication network, wherein the UE completes the registration with the second mobile communication network via the data connection.

16. The apparatus of claim 15, wherein the request is sent in response to the processor determining that the UE is to be registered with the second mobile communication network via a data connection with the first mobile communication network.

17. The apparatus of claim 15, wherein exchanging the plurality of authentication messages with the first mobile communication network comprises embedding registration procedure messages for the second mobile communication network within secondary authentication procedure messages for the first mobile communication network.

18. The apparatus of claim 15, wherein exchanging the plurality of authentication messages with the first mobile communication network comprises embedding non-access stratum ("NAS") messages for the second mobile communication network within NAS messages for the first mobile communication network.

19. The apparatus of claim 15, wherein the request comprises information indicating to the first mobile communication network that the data connection is for registration with a second mobile communication network.

* * * * *